US012653164B2

(12) United States Patent
Drennan et al.

(10) Patent No.: US 12,653,164 B2
(45) Date of Patent: Jun. 16, 2026

(54) SMART, ENVIRONMENTALLY CONTROLLED, MOBILE ENCLOSURE SYSTEM

(71) Applicant: HiveTech Solutions Inc., Wilmington, DE (US)

(72) Inventors: Kimberly A Drennan, Boulder, CO (US); Chelsea Cook, Phoenix, AZ (US); Osvaldo Buccafusca, Fort Collins, CO (US); Daniel Rubenstein, Boulder, CO (US)

(73) Assignee: HiveTech Solutions Inc., Wilmington, DE (US)

( * ) Notice: Subject to any disclaimer, the term of this patent is extended or adjusted under 35 U.S.C. 154(b) by 351 days.

(21) Appl. No.: 18/200,454

(22) Filed: May 22, 2023

(65) Prior Publication Data

US 2023/0284598 A1 Sep. 14, 2023

Related U.S. Application Data

(63) Continuation-in-part of application No. 16/846,208, filed on Apr. 10, 2020, now Pat. No. 11,684,045.

(Continued)

(51) Int. Cl.
*A01K 47/06* (2006.01)
*A01K 51/00* (2006.01)

(52) U.S. Cl.
CPC .............. *A01K 47/06* (2013.01); *A01K 51/00* (2013.01)

(58) Field of Classification Search
CPC ......... A01K 47/06; A01K 47/00; A01K 51/00
(Continued)

(56) References Cited

U.S. PATENT DOCUMENTS

| | | |
|---|---|---|
| 5,741,170 A | 4/1998 | Orletsky et al. |
| 8,507,867 B1 | 8/2013 | Clement et al. |

(Continued)

FOREIGN PATENT DOCUMENTS

| | | | |
|---|---|---|---|
| CN | 110786268 A * | 2/2020 | ........... B32B 27/065 |
| ES | 2391681 A1 | 11/2012 | |
| WO | 2022032414 A1 | 2/2022 | |

OTHER PUBLICATIONS

European Patent Office, "Partial Supplementary European Search Report regarding European Patent Application No. 20787234.2," mailed Dec. 15, 2022, 9 pages, Publ. in: DE.

European Patent Office, "Supplementary European Search Report for European application No. 20787234.2", Apr. 6, 2023, p. 1, Publ. in: DE.

Forjaz, Alexandra, "Extended European Search Report for European application No. 20787234.2," Mar. 20, 2023, p. 3, Publ. in: DE.

(Continued)

*Primary Examiner* — Vivek K Shirsat

(74) *Attorney, Agent, or Firm* — Kilpatrick Townsend & Stockton LLP

(57) ABSTRACT

A mobile enclosure system includes a container and subsystems, including at least one of: a heating unit, a cooling unit, a humidity control unit, and a gas/vapor input unit. The system also includes sensors for monitoring environmental conditions within the container and generating environmental data, and a control unit connected with the subsystems and the sensors. The container includes a mobile foundation and a structural envelope on top of the mobile foundation. The control unit is configured for tracking power consumption by the plurality of subsystems coupled with the container, receiving the environmental data from the plurality of sensors, and modifying at least one operating parameter of the plurality of subsystems in accordance with the environmental data. In embodiments, the structural envelope is a permanent structure or includes insulated panels configured for repeated assembly and disassembly. The system may be compatible with multiple add-on packages for different applications.

15 Claims, 19 Drawing Sheets

Related U.S. Application Data

(60) Provisional application No. 62/832,254, filed on Apr. 10, 2019.

(58) Field of Classification Search
USPC ........................................................... 454/69
See application file for complete search history.

(56) References Cited

U.S. PATENT DOCUMENTS

| | | | |
|---|---|---|---|
| 2017/0360010 A1* | 12/2017 | Wilson-Rich | ............ H04Q 9/02 |
| 2020/0229359 A1 | 7/2020 | Leo | |
| 2020/0323177 A1 | 10/2020 | Drennan et al. | |
| 2021/0206565 A1 | 7/2021 | Neeld | |

OTHER PUBLICATIONS

Matos, Taina, "International Search Report and Written Opinion of the ISA regarding International Patent Application No. PCT/US2024/030612," mailed Aug. 26, 2024, 9 pages, Publ. in: US.

Alker, Kathleen, "Notice of Allowance for U.S. Appl. No. 16/846,208," Mailing date Feb. 1, 2023, 9 pages.

USPTO, "Issue Notification for U.S. Appl. No. 16/846,208," Mailing date Jun. 8, 2023, 2 pages.

Application No. EP20787234.2 , Office Action, Mailed On Jul. 2, 2025, 6 pages.

\* cited by examiner

1500

1510

1534

1582

REFRIGERATION 1530

HEATING 1520    1532

T

1536

T

AIR EXCHANGE

1538

1539

AIR CIRCULATION

1594

1571

T

1572

H    1573

CONTROL UNIT

1596

1580

CO₂

GAS / ENVIRONMENTAL CONTROL 1550

PASSIVE COOLING

ADVANCED INSULATION

GAS

1574

1598

1575

IR MONITORING

VARROA CHEMICAL CONTROL

1590

EMI SHIELDING

1592

LOADING / UNLOADING SYSTEM

MOBILE STRUCTURE

1700

1800

1900

SMART, ENVIRONMENTALLY CONTROLLED, MOBILE ENCLOSURE SYSTEM

REFERENCE TO RELATED APPLICATIONS

The present application is a continuation-in-part of U.S. patent application Ser. No. 16/846,208, filed 2020 Apr. 10 and titled "Mobile Indoor Controlled Apiary System," which claims the benefit of U.S. Provisional Pat. App. No. 62/832, 254, filed 2019 Apr. 10 and titled "Mobile Indoor Controlled Apiary System." All of the above referenced applications are incorporated hereby in their entirety by reference.

SPONSORED RESEARCH AND DEVELOPMENT

A portion of this invention was made with government support under Agreement Number 2018-33610-28619 awarded by the United States Department of Agriculture. The government has certain rights in the sponsored portion of the invention.

FIELD OF THE INVENTION

The present invention relates to mobile structures. In particular, but not by way of limitation, the present invention relates to smart, environmentally controlled, mobile systems for providing controlled indoor environments for a variety of mobile applications.

DESCRIPTION OF RELATED ART

As the demand for pollination services increases, honeybees continue to suffer from population losses and complex health problems. During the past 20 years, the scientific community has attempted to solve this problem by, for example, reducing mite loads with new miticides, diminishing nutritional deficiencies with dietary supplements, and boosting the bee's immune systems using probiotics. However, none of these measures has produced long-lasting reductions of honeybee losses or increased honeybee health to the level that is needed for a stable and healthy honeybee population. For instance, the 2015-2016 annual colony loss survey reports that, between April 2015 and April 2016, beekeepers lost 40.5% of their colonies, with 27% being winter losses. Beekeepers across the United States lost 40.7% of their honeybee colonies from April 2018 to April 2019, according to preliminary results of the latest annual nationwide survey conducted by the University of Maryland-led nonprofit Bee Informed Partnership. The survey asked commercial and backyard beekeeping operations to track the survival rates of their honeybee colonies. Nearly 4,700 beekeepers managing 319,787 colonies from all 50 states and the District of Columbia responded to this year's survey, representing about 12% of the nation's estimated 2.69 million managed colonies. The solutions thus far have been implemented within the framework of conventional beekeeping practices. The lack of success in reducing colony losses strongly indicate that certain management practices need to change.

Varroa mites continue to be a major contributor to colony losses. Varroa mite populations grow exponentially from August until October during the colony's last brood cycle, as Varroa mites reproduce in brood cells. During the fall, honeybee colonies reduce brood production, causing mites to grasp onto adult workers. With increasingly warmer fall temperatures, bees are foraging for longer periods before cold weather discourages foraging activity and, consequently, mites are being transmitted between colonies as bees fly and rob honey from nearby colonies as late as December in some geographic regions. This phenomenon has effectively made the Varroa mite a migratory pest.

While summer losses at 24% are also an issue, honeybees coming out of winter unhealthy, not dead, may be contributing to summer losses later in the year. The survey results show, the annual loss of 40.7% this last year represents a slight increase over the annual average of 38.7%. However, winter losses of 37.7%, were the highest winter loss reported since the survey began 13 years ago and 8.9 percentage points higher than the survey average. One management strategy in particular relates to how colonies are overwintered, as even a ten-percent reduction in overwintering losses will result in an additional 250,000 colonies available for spring pollination.

Evolutionarily, the European subspecies of honeybees, which include most honeybee subspecies utilized in agriculture in the United States, evolved in temperate regions of Europe with cold winters. Thus, this subspecies of honeybees evolved an overwintering state, characterized by a reduction of brood production and foraging activity, as well as long periods of confinement to the hive.

Typically, colonies are treated for mites in the fall just prior to the winter months so as to reduce the number of mites present in the hives during the months in which the honeybees overwinter in the hives. In fact, while many commercial beekeepers are proactively treating for mites 4 to 6 times during the calendar year, studies have shown that such treatments can be ineffective and does not lead to significant reduction in mite load during overwintering due to multiple factors. For example, although the transition to the overwintering state is triggered by many social and environmental cues, a changing food and climate landscape has caused honeybees to forage and remain active later in the fall, thus disturbing this evolutionary adaptation.

In terms of modern honeybee management, indoor overwintering has been practiced for many years in Canada and small pockets of the United States. By housing bee colonies indoors for the winter months, the honeybees are prevented from foraging outside of the containment area, thus reducing the chance of exposure to Varroa mites. For example, in the United States, commercial beekeepers have been using potato barns in Idaho for overwintering since the 1980s. While these barns offered more stable temperatures than being outdoors, they were designed to store potatoes, not to provide conditions required to optimize honeybee health. More importantly, as ambient temperatures in these locations rise or become more extreme, these barns are becoming unsuitable for overwintering bees. As an example, rising temperatures inside these barns are requiring the installation of sprinklers and mechanical ventilation systems, which increase the costs of bee storage.

SUMMARY OF THE INVENTION

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In accordance with an embodiment, a mobile indoor controlled apiary system includes a mobile foundation, a plurality of insulated panels configured for modular assembly to form a structural envelope on top of the mobile foundation, and a removable shell configured for covering the structural envelope. The system further includes a data collection system for gathering environmental data within the structural envelope, and a climate control system configured for regulating environmental conditions within the structural envelope.

In another embodiment, the data collection system gathers environmental data at a plurality of locations within the structural envelope. In a further embodiment, the climate control system is configured for controlling at least one of temperature, humidity, ventilation, and carbon dioxide levels within specified tolerances, in response to the environmental data collected by the data collection system. In still another embodiment, the specified tolerances are optimized for health conditions of bees contained within the structural envelope. In a still further embodiment, the specified tolerances are defined for providing at least one of preserving bee colony strength in cold months, reducing exposure to harmful pathogens, and ameliorating stress factors.

In still another embodiment, at least two of the insulated panels are interchangeable. In a further embodiment, the plurality of insulated panels is reconfigurable for assembly into structural envelopes of at least two different configurations.

In yet another embodiment, each one of the insulated panels is configured to be attachable to each other in a weathertight manner without additional attachment hardware. In another embodiment, the system is configured to be mobile so as to be repeatably assembled and disassembled. In a further embodiment, the removable shell is configured to be weather resistant. In another embodiment, the system further includes a plurality of straps for securing the structural envelope onto the mobile foundation.

In a further embodiment, a mobile enclosure system includes a container and subsystems, including at least one of: a heating unit, a cooling unit, a humidity control unit, and a gas/vapor input unit. The system also includes sensors for monitoring environmental conditions within the container and generating environmental data, and a control unit connected with the subsystems and the sensors. The container includes a mobile foundation and a structural envelope on top of the mobile foundation. The control unit is configured for tracking power consumption by the plurality of subsystems coupled with the container, receiving the environmental data from the plurality of sensors, and modifying at least one operating parameter of the plurality of subsystems in accordance with the environmental data. In embodiments, the structural envelope is a permanent structure or includes insulated panels configured for repeated assembly and disassembly. The system may be compatible with multiple add-on packages for different applications. In embodiments, each add-on package may be swapped out for another add-on package.

In embodiments, the plurality of subsystems includes at least one of: an air circulation unit, a gas/environmental control unit, an infrared monitoring unit, a Varroa chemical control unit, an electromagnetic interference (EMI) shielding mechanism, a loading/unloading system, advanced insulation, optical monitoring unit, and an illumination unit.

In embodiments, each one of the plurality of sensors is configured for monitoring at least one of: temperature, humidity, altitude, pressure, orientation of the container, location, gas composition within the container, illumination, and electromagnetic radiation.

In embodiments, the structural envelope wherein the structural envelope further includes at least one of foam, fiberglass, glass wool, natural wool, cork, straw, hemp, resin, polyurethane, polystyrene, cellulose, polyethylene, polyisocyanurate, vacuum gap, gas-filled gap (e.g., air, neon, argon, and the like), aerogel, and phase change material. In certain embodiments, the phase change material is selected for providing a passive cooling effect with temperature as the phase change material changes from a first phase to a second phase.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

Figure 1:
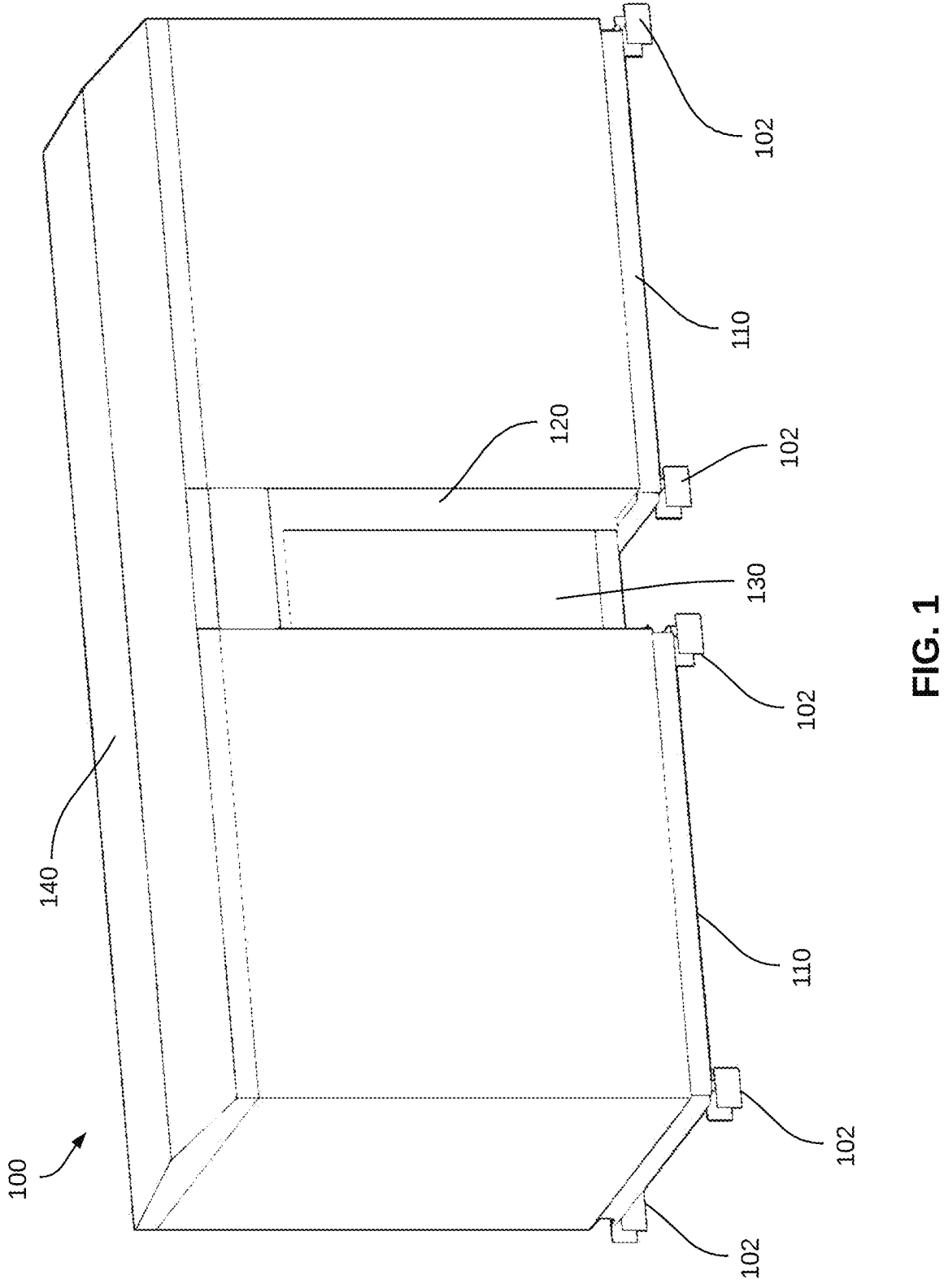
FIG. 1 illustrates an isometric view of a mobile indoor controlled apiary (MICA) system, in accordance with an embodiment.

For simplicity and clarity of illustration, the drawing figures illustrate the general manner of construction, and descriptions and details of well-known features and techniques may be omitted to avoid unnecessarily obscuring the embodiments detailed herein. Additionally, elements in the drawing figures are not necessarily drawn to scale. For example, the dimensions of some of the elements in the figures may be exaggerated relative to other elements to help improve understanding of the described embodiments. The same reference numerals in different figures denote the same elements.

The word "exemplary" is used herein to mean "serving as an example, instance, or illustration." Any embodiment described herein as "exemplary" is not necessarily to be construed as preferred or advantageous over other embodiments. In the following detailed description, references are made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or apparatuses. The following detailed description is therefore not to be taken in a limiting sense, and the scope of the present disclosure is defined by the appended claims and their equivalents.

DETAILED DESCRIPTION OF THE INVENTION

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Winter worker bees are physiologically distinct from their summer counterparts. Winter bees have more fat and protein in their bodies for survival and spring brood rearing, and they form a thermoregulatory cluster that collectively shivers to keep the colony warm and active. That is, a healthy winter bee colony exhibits specific temperature signatures that can be detected with strategically placed temperature sensors. Conversely, an unhealthy winter bee colony with, for example, a Varroa mite infestation can be detected using a sensor-based honey bee hive monitoring system. Additionally, the bee colony population size can also be extrapolated from information from various sensors.

The present disclosure describes embodiments related to providing a mobile, controlled, indoor environment for overwintering bees. Embodiments described herein are suitable for use in agriculturally dense areas, even with high land costs, for reducing load stresses caused by Varroa infestation. The mobile approach also greatly reduces the capital investment and time required for construction compared to building permanent, specialized structures for overwintering bees, and allows more options for the selection of ideal installation locations, such as on fallow lands leased from growers. Even during transport between pollination sites outside of the winter months, the embodiments described herein provides a cleaner, controlled, quieter environment for transport compared to traditional methods, for example, of loading stacks of hives directly on a flatbed truck. The embodiments described herein also allows beekeepers the option of selecting the time periods in which the hives are overwintered by providing a controlled environment suitable for overwintering, thus reducing costs of feed and miticide treatments.

As described hereinafter, a mobile indoor controlled apiary (MICA) is an environmentally controlled indoor apiary, which includes a foundation, a lightweight, panelized insulated structural envelope, a removable weather resistant shell, an heating-ventilation-air conditioning (HVAC) system that regulates temperature, humidity, ventilation, and carbon dioxide within specific tolerances, and a data collection system that assists in the optimization of the interior conditions for honey bee health.

The system is modular in design to allow for the aggregation of units over time or to create a range of environmental zones. The MICA system is configured to be easily transported, quickly assembled and disassembled such that the system can be implemented seasonally and easily stored when not in use. The MICA system provides an indoor habitat for honey bees that allows: 1) preservation of colony strength throughout the winter months; 2) reduction in exposure of the honey bees to stressors and harmful pathogens; 3) ready transportation to desired locations (i.e., bring the ideal overwintering conditions to the hive locations, rather than transporting the hives to a permanent structure such as a barn); 4) reduction in cost of hive maintenance and treatment, if necessary; and 5) a non-chemical method to interrupt the brood cycle by providing the ideal overwintering conditions to naturally reduce the brood cycle.

The MICA system creates and maintains an optimal climate range to encourage the clustering behavior of honeybees, which is a key feature of overwintering. The MICA system also includes one or more sensors for data collection, reporting, and management, such as temperature sensors to measure temperature distribution, humidity, and carbon dioxide levels. Optionally, the MICA system includes measurements of the system power consumption for use in optimizing the power draw or battery capacity to operate the system. Furthermore, by its modular nature, the MICA system can be configured in a variety of ways, such as juxtaposed zones with differing environmental conditions for accommodating different applications, including cold storage of crops during the summer months when the MICA system is not needed for bee colony overwintering uses.

Referring now to the figures, an exemplary embodiment of the MICA system is described. FIG. 1 shows an isometric view of a mobile, indoor controlled apiary (MICA) system 100, in accordance with an embodiment. MICA system 100 includes a plurality of feet arrangements 102 supporting mobile foundations 110. Optionally, feet arrangements 102 are adjustable such that MICA system 100 can be placed, for example, on uneven ground. MICA system 100 further includes a plurality of panels (not visible in FIG. 1) that form a structural envelope 120, creating a contained indoor environment therein. A door 130 provides access inside structural envelope 120. A cover 140 is placed over and around structural envelope 120 to provide additional weather resistance.

Figure 2:
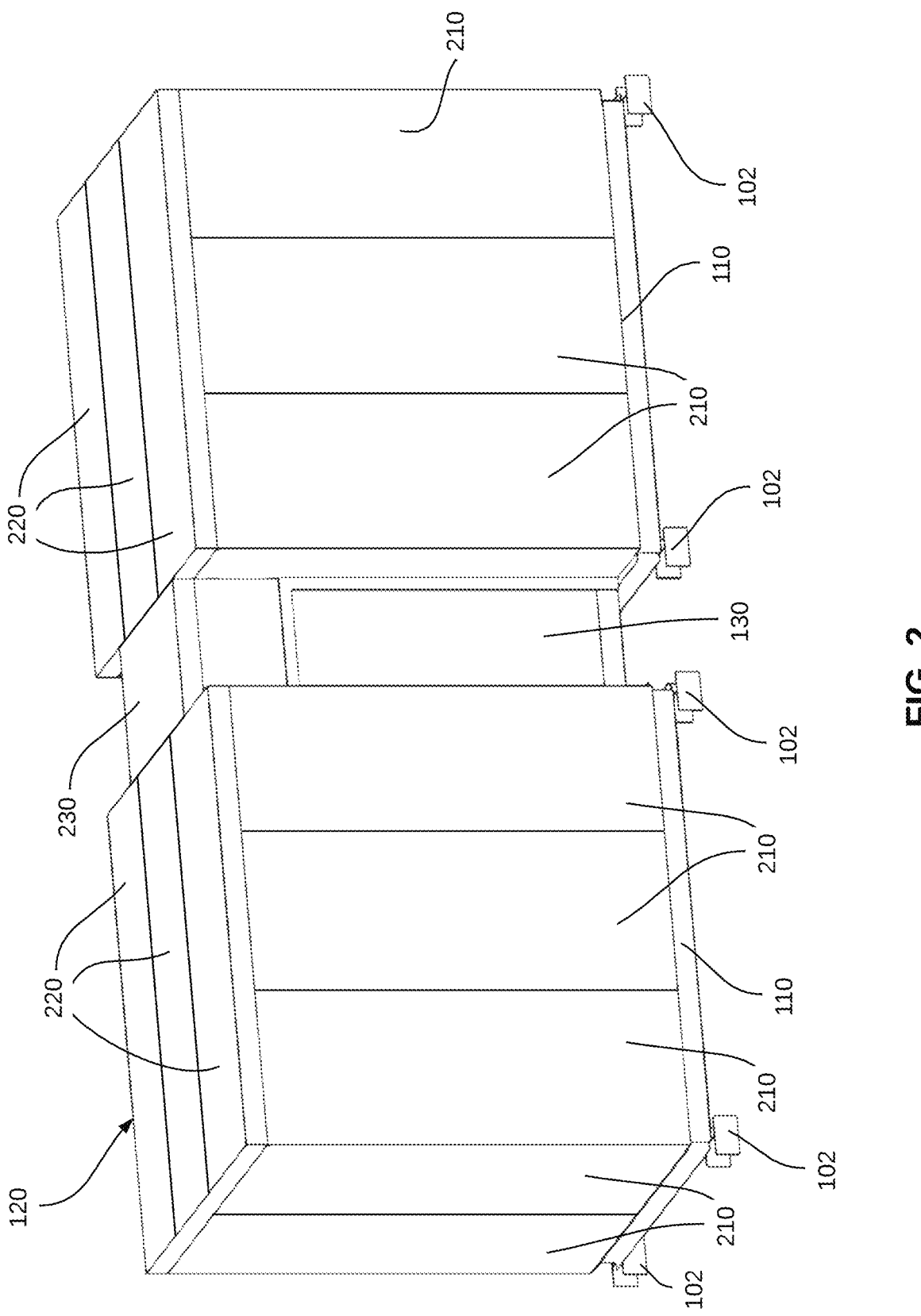
FIG. 2 shows an isometric view of the MICA system with its cover removed, in accordance with an embodiment.

Referring to FIG. 2, MICA system 100 is shown with cover 140 removed, thus showing details of various panels forming structural envelope 120. As shown in FIG. 2, a plurality of wall panels 210 form the vertical surfaces of structural envelope 120, while roof panels 220 and a connector panel 230 form the roof portion of structural envelope 120. In an embodiment, wall panels 210, roof panels 220, and connector panel 230 are insulated, lightweight panels that can be stored flat when not assembled. Optionally, wall panels 210, roof panels 220, and connector panel 230 are identical and interchangeable in a LEGO® brick fashion. Furthermore, multiple MICA systems can be connected together.

Continuing to refer to FIG. 2, wall panels 210, roof panels 220, and connector panel 230 are joined together using, for example, screws, pins, brackets, hook-and-loop connectors, straps, ratcheting mechanisms, and other suitable means. Additional interface components, such as weather stripping, gaskets and/or sealants, can be provided around at the panel connection interfaces such that wall panels 210, roof panels 220, and connector panel 230 are connectable in a weather resistant way. That is, when connected, wall panels 210, roof panels 220, and connector panel 230 do not allow, for example, moisture through the interfaces therebetween. The weather resistance of the panel connection interfaces is enhanced by the addition of cover 140, as shown in FIG. 1.

Figure 3:
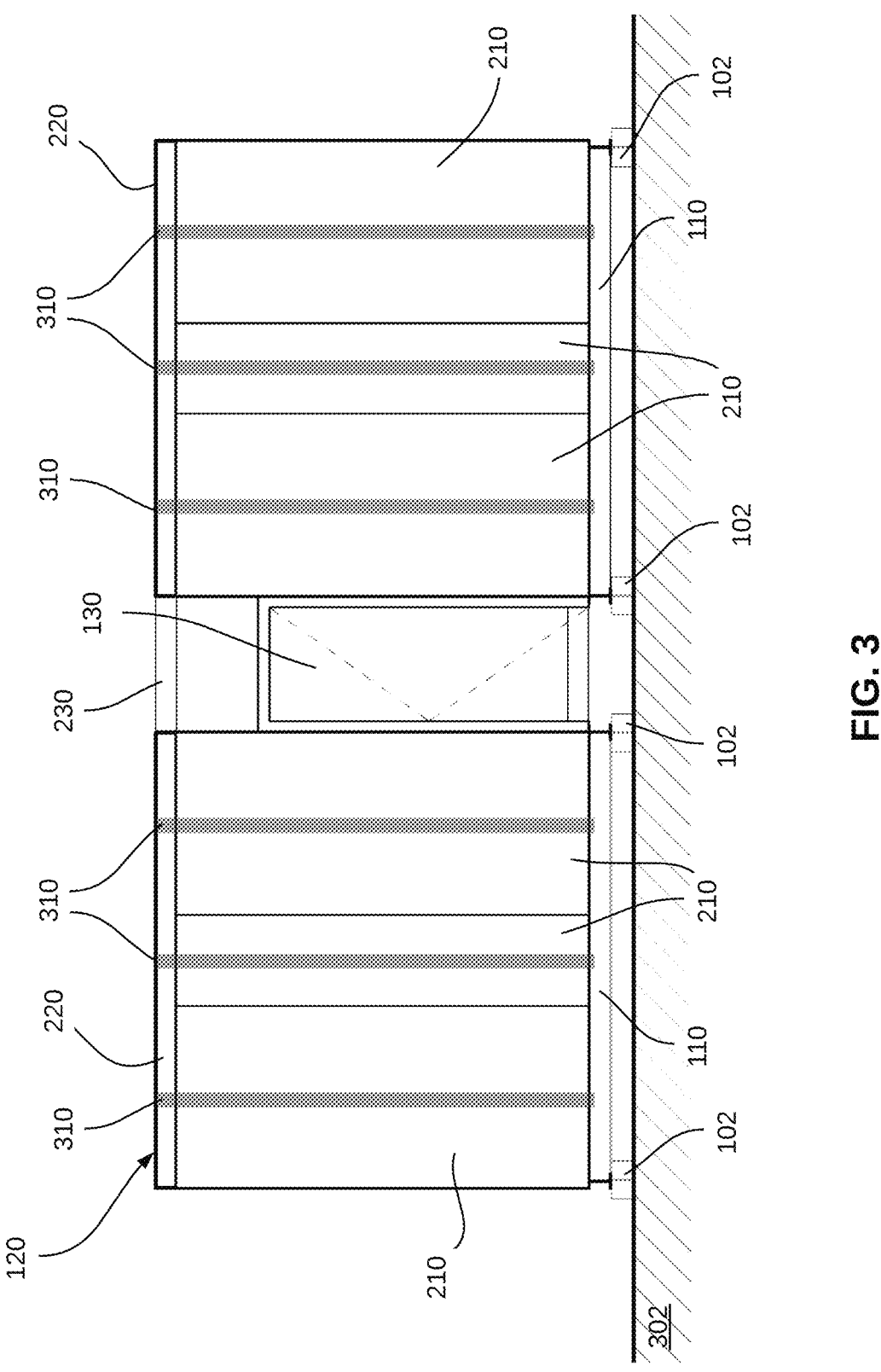
FIG. 3 illustrates a side view of the MICA system with its cover removed, shown here with straps attaching the structural envelope onto the mobile foundation, in accordance with an embodiment.

Referring now to FIG. 3, a front view of the MICA system is shown, illustrating a plurality of optional straps 310. Optional straps 310 provide additional structural stability to structural envelope 120. Additionally, straps 310 can be secured to foundation 110 to affix structural envelope 120 to foundation 110.

Figure 4:
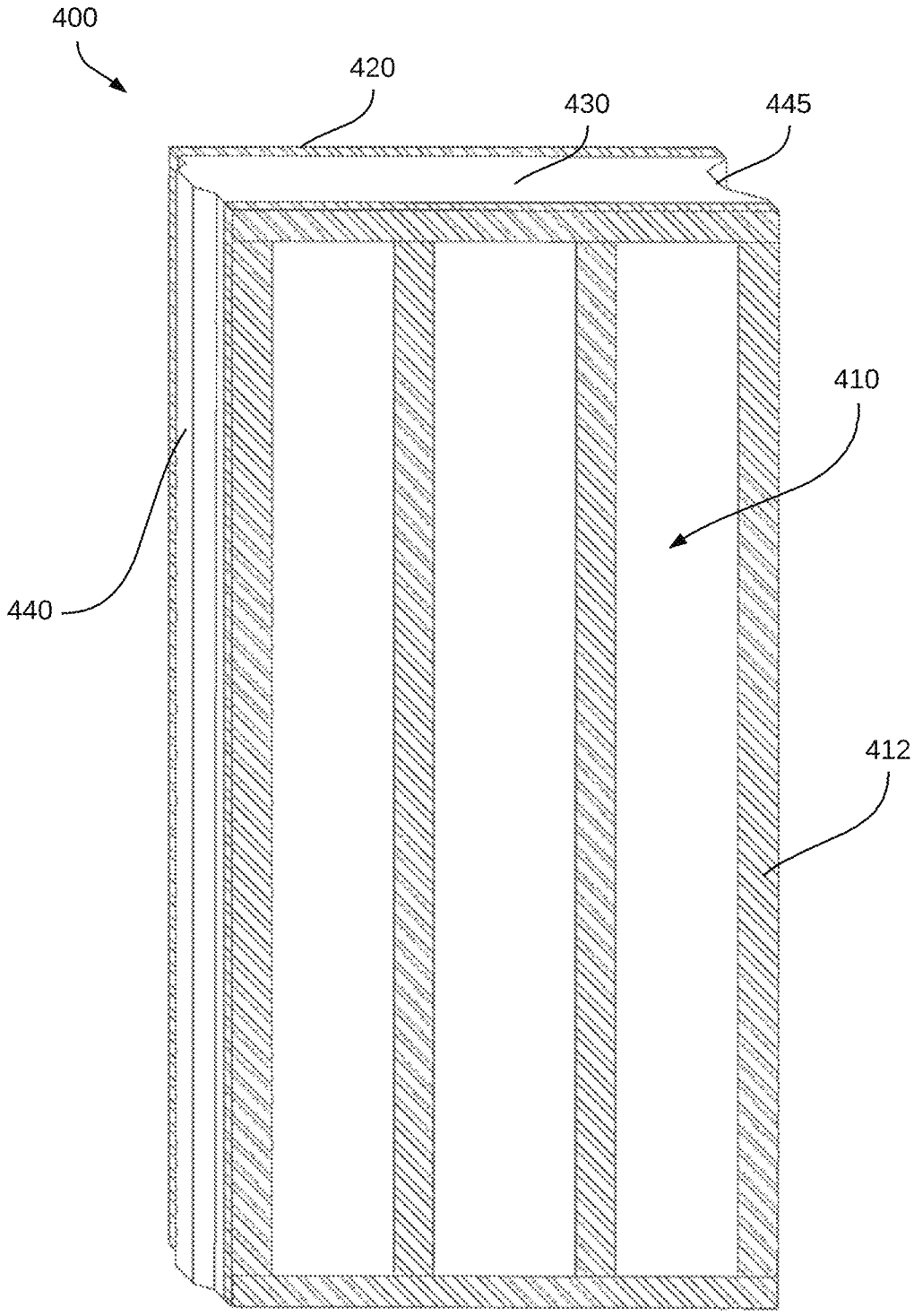
FIG. 4 illustrates an isometric view of one of the panels forming a structural envelope of the MICA system, in accordance with an embodiment.

An exemplary panel assembly 400 is shown in FIG. 4. As shown in FIG. 4, panel assembly 400 includes an external face 410, including a frame 412, and an internal face 420, separated by an insulating core 430. In an embodiment, insulating core 430 includes a tongue feature 440 and a groove feature 445 on opposing edges such that adjacent panels interlock. Lightweight metal frame 412 provides additional structural integrity.

Figure 5:
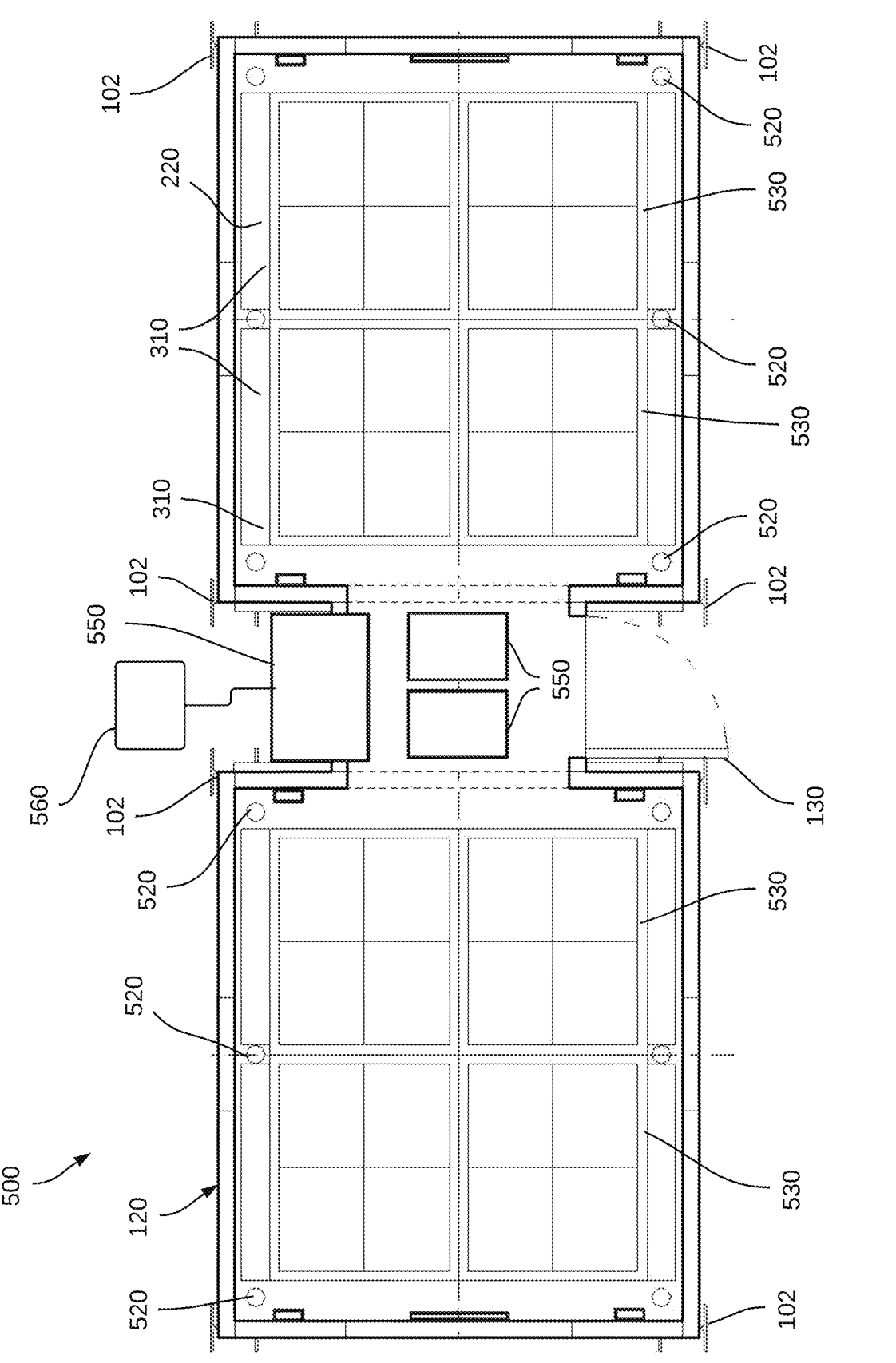
FIG. 5 illustrates a top, cutaway view of the MICA system, shown here to illustrate an exemplary placement configuration of hive boxes, sensors, and mechanical components within the MICA, in accordance with an embodiment.

Referring to FIG. 5, an exemplary embodiment of the internal arrangement of the MICA system is described. As shown in FIG. 5, a MICA system 500 includes a plurality of sensor 520 configured to collect data related to the environmental conditions around hives 530 stored within structural envelope 120. Sensors 520 are located at various locations around the perimeter of hive boxes 530 at different heights so as to provide data necessary to evaluate the health of the bee colonies within hive boxes 530. For example, sensors 520 can be configured for measuring temperature, humidity, carbon dioxide levels, or other environmental data within structural envelope 120. As described above, analysis of such sensor data can allow detection of mite infestations and other anomalies that can negatively affect the health of the bee colonies. Additional sensors placed outside of structural envelope 120 can be used to help identify possible correlations between external environmental conditions and bee colony health.

In an example, the data is gathered in multiple hive boxes supported on pallets by gateway units used as sensors 520. The gateways, for instance, are solar powered or can be directly connect to an AC power source. In an example embodiment, the gateway has a power and data line directly plugged into the MICA to allocate and transmit data from each hive box to the cloud. This data transmission can be, for instance, DC powered with conversion from AC. Each gateway collects and transmits the data through, for example, a cellular modem, a satellite link, a wired network, and/or a WiFi connection. The multiple gateways can be arranged in a preset configuration, such as arranged in a row on a sensor bar, which can be installed on each hive box. Data from each hive box can then be used as input to a control mechanism to adjust the environmental conditions within structural envelope 120.

Additionally, a HVAC system components 550 provides environmental within structural envelope 120. HVAC system components 550 are controlled by a controller 560 such that, based on data collected by sensors 520, controller 560 adjusts the output of HVAC system components 550 to manipulate various environmental conditions within structural envelope 120 to within ideal ranges, in an example. For instance, controller 560 is programmed with logic algorithms that determine the health condition of the hives based on the collected environmental data and adjust the output of HVAC system 550 to bring the internal environment within structural envelope 120 to optimal levels.

As an example, honeybees generally exhibit overwintering behavior when the temperature around the hive drops below 10° C. Therefore, the temperature within structure envelope 120 should remain, for instance, in the 5° C. to 6° C. range for the bees to remain in overwintering conditions. Also, the humidity should be controlled to be less than 65% relative humidity within structural envelope 120 to discourage the growth of mites and other parasitic organisms. Alternatively, the temperature within structure envelope 120 is kept around 4° C., with a relative humidity range of 45 to 80%, or below dewpoint. If "smart hives" with internal sensor mechanisms are used as hives 530, controller 560 can be configured for further taking into consideration the measurements taken at the individual hive level to adjust the internal environmental conditions within structural envelope

120. HVAC system components 550 includes, for instance, a combination of an heating unit, a cooling unit, a ventilation unit (e.g., energy recovery ventilator (ERV) unit), humidifier, dehumidifier, condensate pump, fans, radiant heater, and/or other means of regulating the temperature, humidity, and air flow within the structural envelope. The cooling unit, for example, is an 8,000 BTU air conditioner with a cooler controller for cooling the air within the MICA system to 7.2° C. Alternatively, refrigeration AC units can be used for further flexibility in achieving lower temperature settings. Airflow can be distributed via fans or through ductwork (not shown).

As an example, additional features, such as heat tape applied at the exit of the condensate drainpipe, insulated pipes, cold-resistant couplings, and others, are used to protect the HVAC system in harsh environments, such as in high humidity and extremely cold climates. In an embodiment, the ERV is configured to introduce outside air into the structural envelope only if the carbon dioxide level rises above a specified threshold. In an embodiment, the ERV flow rate is used to modulate the temperature within the structural envelope in emergencies (e.g., heating/cooling system failure) or if there is sufficient temperature gradient present between the outdoor conditions and the conditions within the structural envelope, such that the ERV acts as an economizer, thus providing climate control more efficiently than using the heating/cooling systems. Screens or filters can optionally be added to the air intake within the MICA system to prevent bees from getting pulled into the HVAC system. The heating unit is, for example, a gas heater, an electric heater, a ceramic panel heater, or a combination thereof.

In an example, sensors 520, optional smart hives, HVAC system components 550, and controller 560 are configured to run off of standard 120V power drawn from the standard power grid. Alternatively, other power sources, such as solar, wind, and/or battery can be used to power the components of the MICA system. Power can be supplied to the MICA system by, for example, standard 120V/60 Hz circuitry, 240V AC, 1- or 2-phase 40 Amp circuits, battery power, solar panels, generators, and other power supply means. Optionally, redundancy can be built into the MICA system by, for example, providing backup sensors, a secondary HVAC system (not shown), a backup power source (not shown), backup control systems, backup logic, and other failure mitigation arrangements. In one example, the sensors are powered by one backup power system (e.g., battery system), while the HVAC system is on a second backup power system (e.g., fueled generator) in order to maintain data collection even if the HVAC system fails.

Controller 560 is configured to coordinate operations between sensors 520 and HVAC system components 550. In an example, controller 560 contains logic to allow remote control and monitoring of the mechanical components, such as via cellular, satellite, wired, and other appropriate communications means. Controller 560 also controls relay switches that allow on/off power control of the various mechanical components. For example, the controller includes logic to coordinate operation of mechanical components and sensors to monitor loads on the various components, and collects operational data to inform future design decisions (e.g., determine whether the installed components and backup systems adequately sized, correctly configured and distributed within the MICA system).

Figure 6:
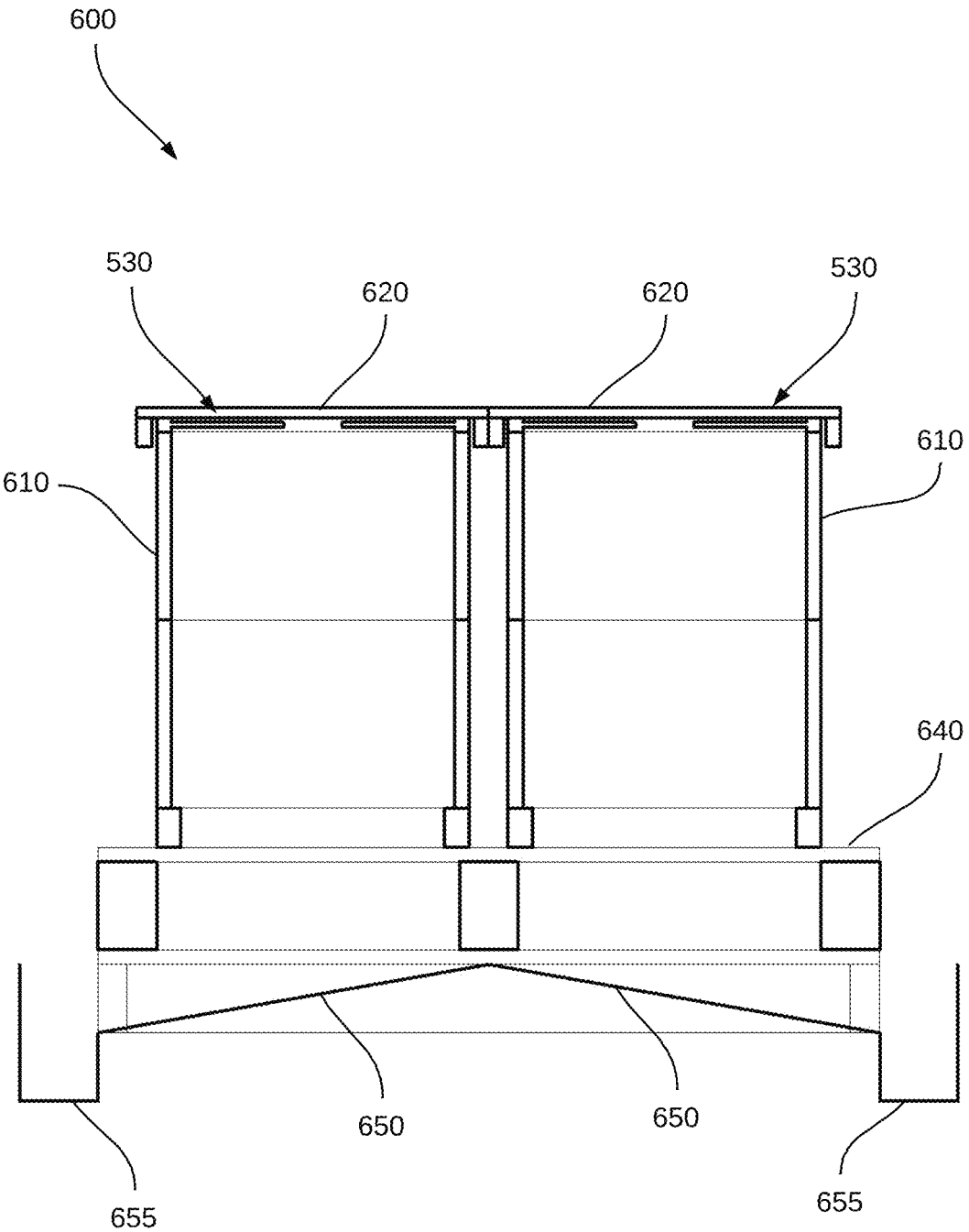
FIG. 6 illustrates a cross-sectional view of a pallet of hive boxes, in accordance with an embodiment.
Figure 7:
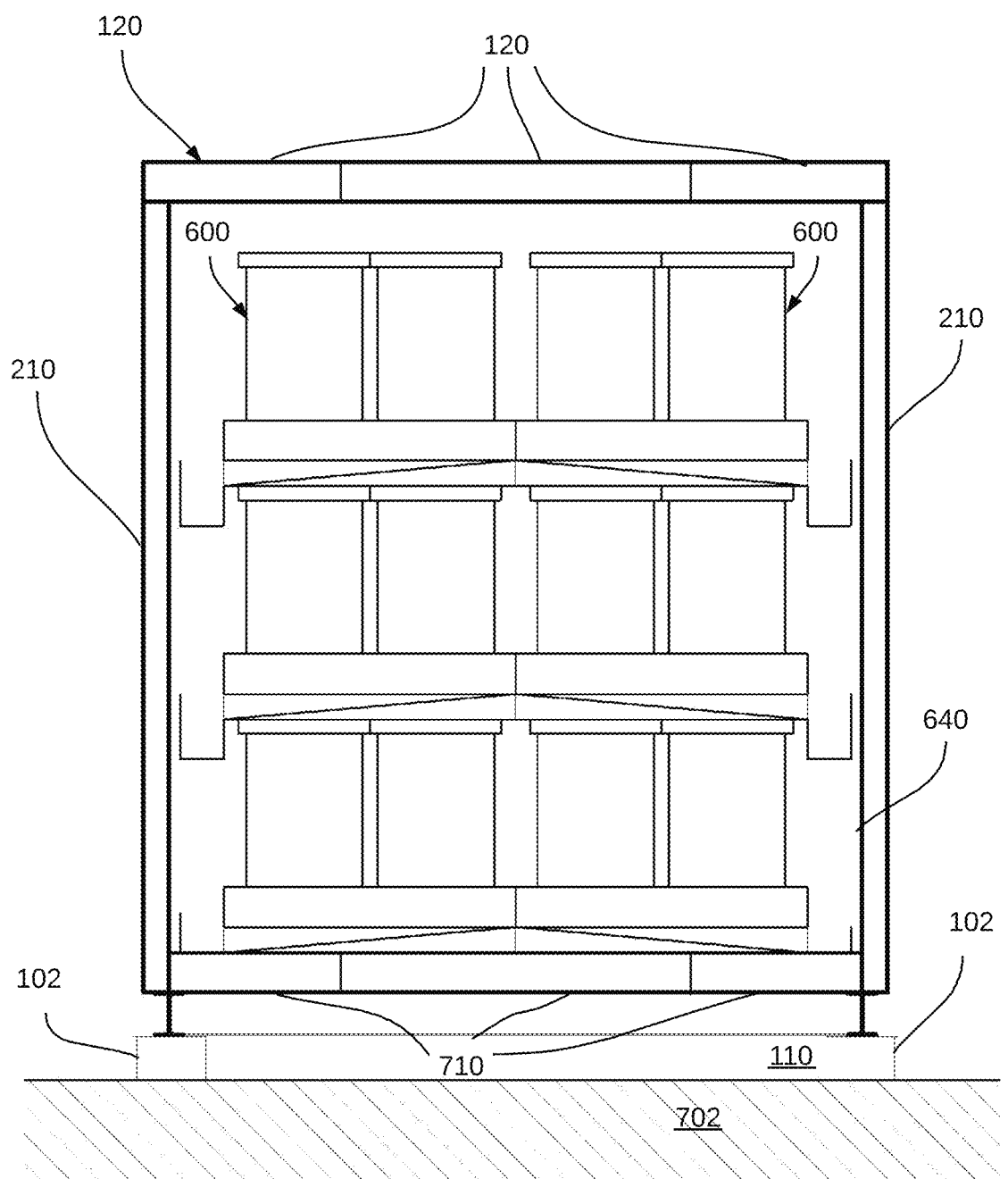
FIG. 7 illustrates an end, cutaway view of the MICA system, shown here to illustrate an exemplary stacking configuration of pallets of hive boxes.

FIG. 6 illustrates a cross-sectional view of a pallet of hive boxes, in accordance with an embodiment. As shown in FIG. 6, a pallet system 600 includes two hive boxes 530, including outer frames 610 and removable lids 620, supported on a pallet 640. Outer frames 610 and pallet 640 are configured to allow dead bees and debris to drop to slopes 650 such that dead bees and debris are collected in gutters 655. The dimensions of pallet system 600 are configured such that multiple pallet systems are stackable, as shown in FIG. 7. In FIG. 7, floor panels 710 forming the floor of structural envelope 120 are also visible. In an embodiment, floor panels 710 are interchangeable with at least one of wall panels 210 and roof panels 220 for ease of assembly.

Figure 8:
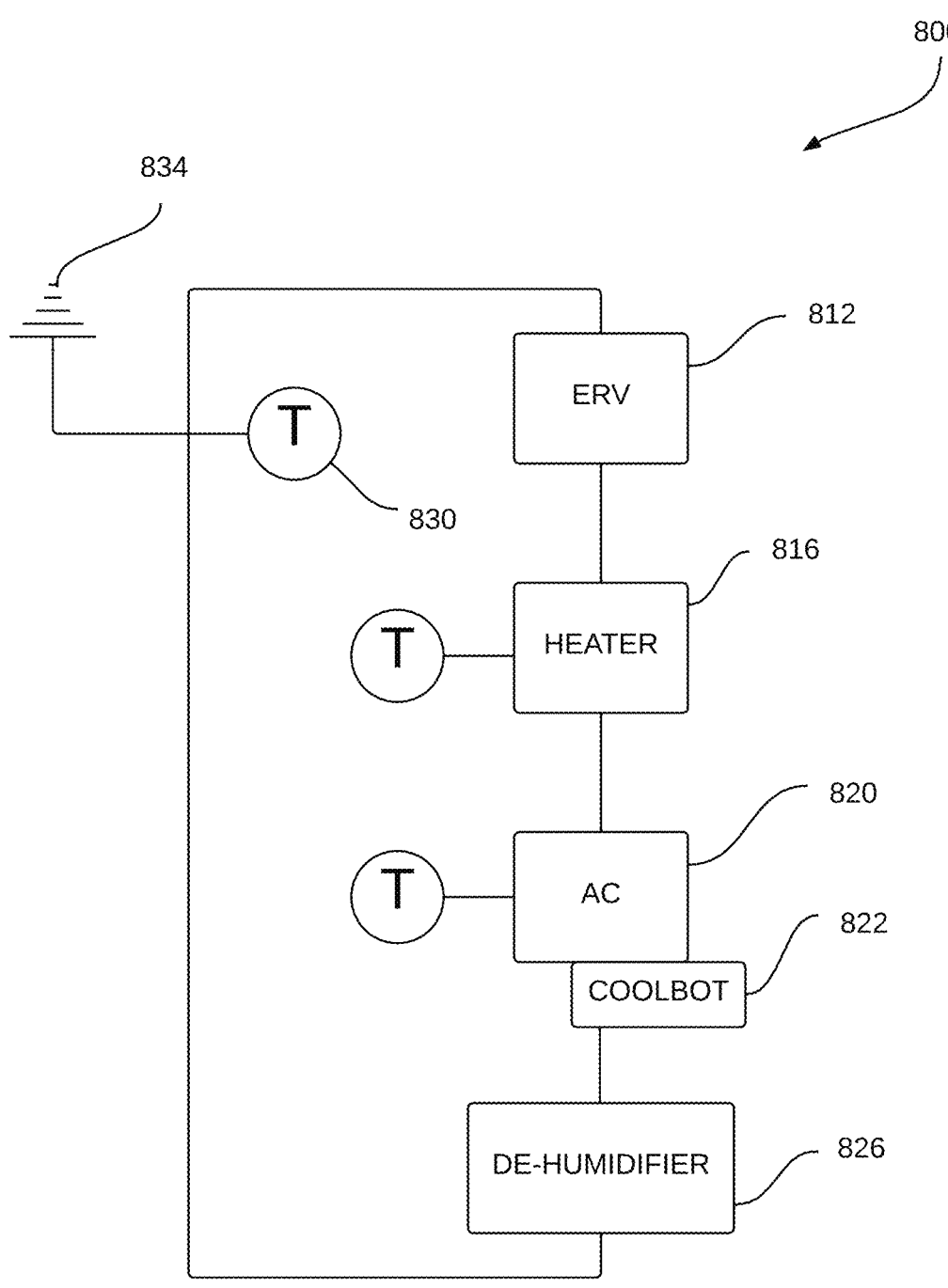
FIG. 8 shows a schematic of an exemplary configuration of an environmental conditioning system, in accordance with an embodiment.

FIG. 8 shows a schematic of an exemplary configuration of an environmental conditioning system, in accordance with an embodiment. In the embodiment shown in FIG. 8, the environmental conditioning system includes an ERV, a heater, an air conditioning system with a cooler controller attachment, and a dehumidifier. In the present example, the ERV is set for continuous operation, the heater is set to turn on when the temperature measured at a temperature sensor (represented by a circle-T symbol) is less than 5° C. The air conditioning system is set for continuous operation to maintain the internal temperature within the structural envelope at 6.1° C. The dehumidifier is set to operate continuously to maintain the humidity within the structural envelope at a low humidity condition, such as less than 65% relative humidity, which is suitable for bee health. Alternatively, the air conditioning system is preset to keep the temperature within the structure envelope at around 4.4° C., and the dehumidifier operates to maintain the relative humidity range of 45%-95% or below dewpoint.

Figure 9:
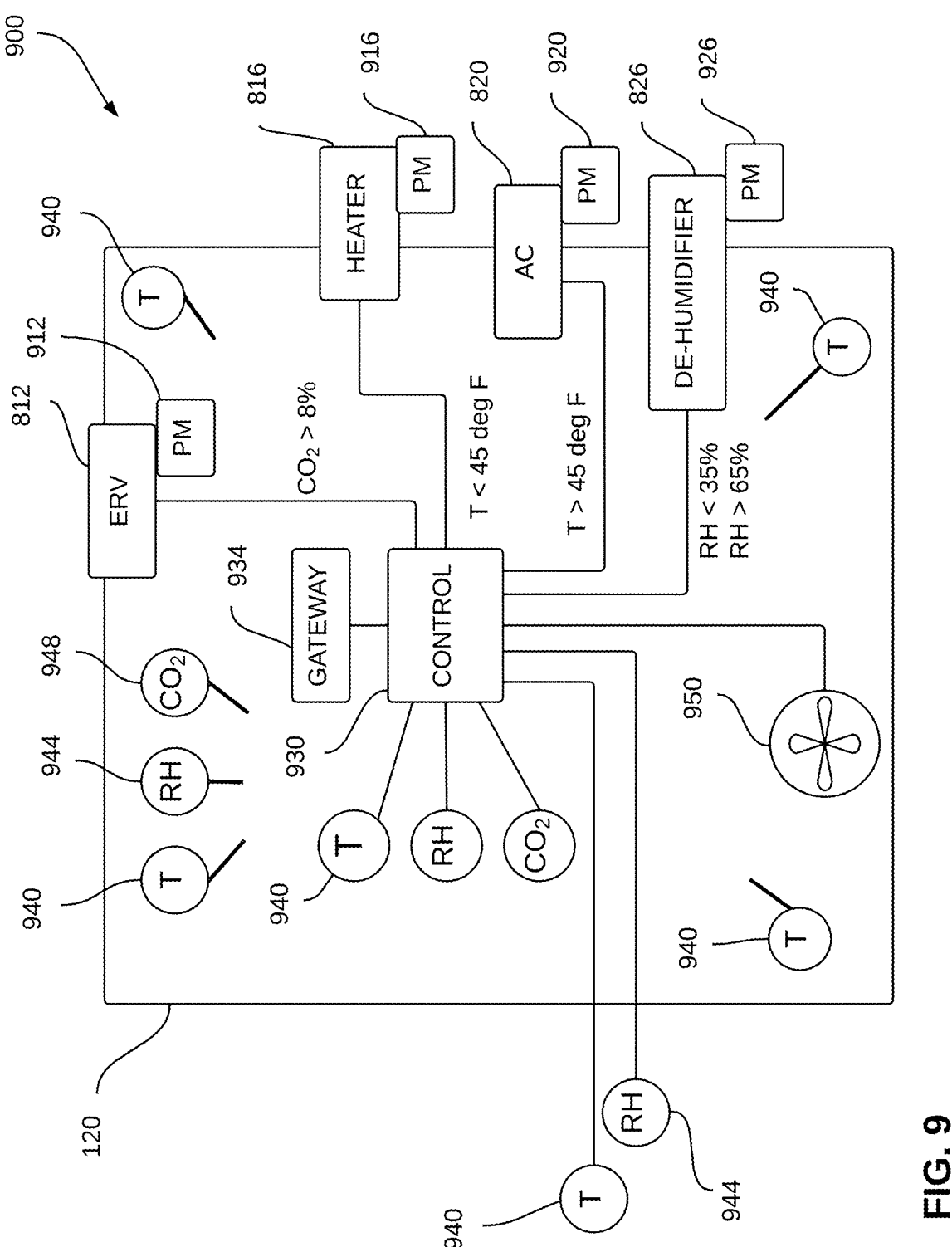
FIG. 9 shows a schematic of another exemplary configuration of an environmental conditioning system, in accordance with an embodiment.

FIG. 9 shows a schematic of another exemplary configuration of an environmental conditioning system, in accordance with an embodiment. The environmental conditioning system of FIG. 9 includes additional sensors, such as carbon dioxide sensors (represented by a circle-CO2 symbol) and relative humidity sensors (represented by a circle-RH symbol), a central controller, a gateway system, a fan system, backup logic, and sensors placed inside and outside the structural envelope to more finely tune the environmental conditions.

In an embodiment, the MICA system is designed to withstand use by commercial scale beekeepers. For instance, the feet arrangement, mobile foundation, and panels are configured to be lightweight and insulated such that the structural envelope can be assembled and disassembled (e.g., flat packed) at the selected installation location. In an example, the MICA system is designed to be installed in the field by two people within a four-hour time period. In an embodiment, the overall dimensions of the disassembled system meet cargo standards for road transportation. In an embodiment, the mobile foundation supports 150 pounds per square foot (psf), while the roof panels, when assembled, supports 80 psf. Ideally, the connections between all panels are weathertight. In an embodiment, one or more of the wall panels are removable even after assembly of the structural envelope so as to allow pallet loading of hives into the MICA system with, for example, a forklift. The weather resistant cover can be attached, for example, by a zipper, hook-and-loop attachment, screws, brackets, elastic cords, hooks, clips, snaps, buttons, or other connective assemblies.

In general, the design of the mobile, climate-controlled apiary is intended to create a suitable habitat for honeybees during times of inclement environment conditions and during periods where reducing colony activity is required. The system functions as a temporary barrier from unsuitable or difficult environmental conditions. To meet the specific needs of beekeepers while optimizing the health, security, and comfort of their honeybees during difficult times of the year, a modular cold storage option such as the MICA system is desirable. Modular cold storage solutions put beekeepers in control; they are an option for beekeepers who want to avoid the stress of transportation or risk of large cold storage facilities. Specifically, the desired features are:

1) Modular design: The MICA system is formed of a bee storage subunit and a mechanical subunit that controls the environment in which the bees are kept.

2) Scalable: the MICA system is scalable to fit any beekeeping operation and can grow as a beekeeping operation grows.

3) Specific environmental control system design: Honeybees are very different from refrigerated produce. Like any living creature, they need a comfortable environment that can provide reliable heating, cooling, fresh air, and proper humidity in order to thrive. The MICA system has controllable set points for temperature, humidity, and CO2 to keep bees comfortably chilled in any climate zone. Environmental conditions are constantly monitored and controlled remotely.

4) Power: The MICA system plugs into a standard 120V/240V outlet. A back-up generator with an automatic remote start option can power the unit in the event of power loss. Every component has a redundant system and backups in case of failure. Solar power with battery backup is available for remote locations. The unit can be quickly disassembled if bees need to be removed fast.

5) Timing: Beekeepers are in control of when their bees go into cold storage within the MICA system, and can place them in different yards at different times—after they have collected enough food for the winter and/or before mites become a problem.

6) Location: With the MICA system, beekeepers decide where their bees overwinter: It can be placed in all weather conditions and it runs off of a standard 120V/240V outlet, backed up with a generator.

7) Construction: The MICA system can be constructed easily by two people and basic tools within a day. It can be constructed on the ground or on a trailer.

8) Cold storage transportation: The MICA system is a modular cold storage unit created to give honeybees a stable winter environment. Cold storage transportation benefits include: 1) Reduced temperature stress on colonies and queens; 2) More flexible loading and unloading logistics for beekeepers, as the MICA unit can be staged in holding yards, allowing beekeepers to unload in small batches when the weather is favorable; and 3) Pallets are kept clean during overwintering, reducing the time of inspection at state inspection locations when required.

9) Additional uses for a modular cold storage unit: The MICA system is well-suited to put bees into short-term cold storage to induce a brood break to increase efficacy of miticides. Additionally, since this unit brings a controlled environment to the field, therefore can be used to rapidly cool and store produce post-harvest, especially for small farmers. Further, the MICA system can be used for storage of tools, boxes, and potentially bee or other livestock feed.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. For example, the MICA system can be run using a completely remote power supply such that it can be operated off-grid. The MICA system can include feeding/treatment systems to automatically provide tailored feeding and treatment to individual hives, if necessary. An active cleaning system can be incorporated into the structural envelope to facilitate the maintenance of a clean environment within the MICA system.

Figure 10:
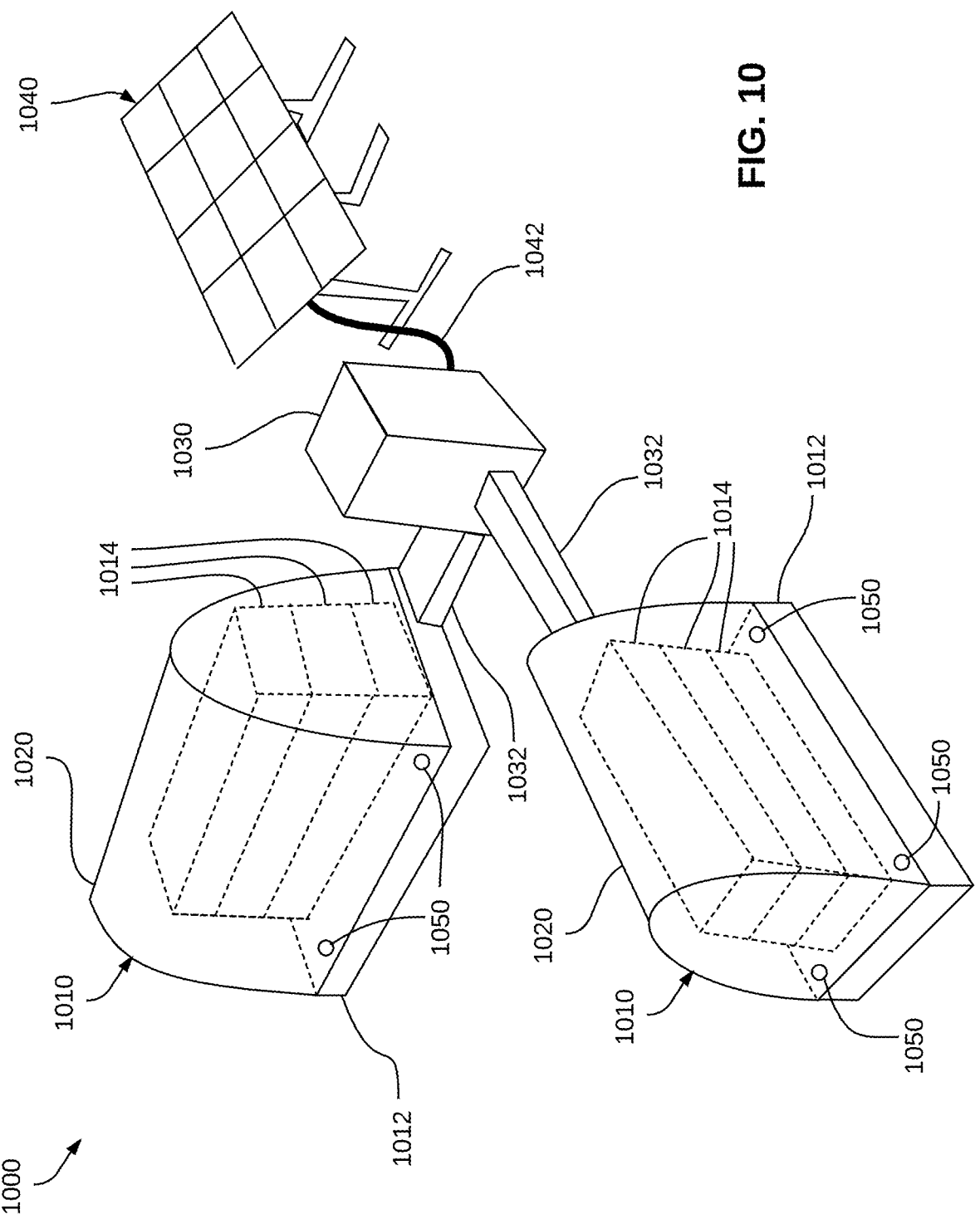
FIG. 10 shows a schematic of another exemplary embodiment of a "pop-up" version of the MICA system.

FIG. 10 shows a schematic of an even more mobile, "pop-up" version of the MICA system, in accordance with an embodiment. As shown in FIG. 10, alternative MICA system 1000 includes one or more pop-up systems 1010 (two are shown in FIG. 10). Each pop-up system 1010 includes a portable floor 1012, configured for providing a solid foundation on which to support one or more hive boxes 1014 off of uneven, irregular, wet, and/or unstable ground. Portable floor 1012 is also configured for supporting an inflatable shell 1020 thereon to protect hive boxes 1014 from the environment while providing a structural envelope for pop-up system 1010. Portable floor 1012 and/or inflatable shell 1020 are configured to cooperate with an HVAC system 1030, which is connected via ducting 1032 to each one of pop-up systems 1010.

Still referring to FIG. 10, HVAC system 1030 is configured for supporting one or more pop-up systems to provide centralized sensor monitoring and environmental control for the pop-up systems connected thereto. Furthermore, HVAC system 1030 is designed to provide sufficient pneumatic pressure to keep each inflatable shell 1020 inflated around hive boxes 1014. HVAC system 1030 is powered, for example, by an external power source, such as a solar panel system 1040 or generator (not shown), via a power connection 1042. In this way, pop-up system 1010 can be a passive system with no electronic power, in accordance with an embodiment. Alternatively, portable floor 1012 and/or inflatable shell 1020 is equipped with battery or generator power source or connectable with an external power source (e.g., a power grid, or an off-grid source, such as an external generator, solar panels, wind power, etc.).

In an embodiment, portable floor 1012 and/or inflatable shell 1020 includes internal electrical and/or ductwork to connected with HVAC system 1030. As an example, portable floor 1012 includes a plurality of sensors 1050 integrated therein to measure a variety of environmental parameters such as temperature, air pressure, and humidity. Additional functionality, such as shock or vibration sensors and a global position system (GPS), can also be integrated into portable floor 1012 and/or inflatable shell 1020. Similarly, HVAC system 1030 is equipped with communication capability (e.g., cellular communications, satellite communications, and/or wireless network connectivity) so as to communicate its status to a system administrator located away from alternative MICA system 1000, in an embodiment.

Alternative MICA system 1000 has the advantage that the system can be deployed where the hives are already located. That is, alternative MICA system 1000 can be deployed directly at whatever agricultural setting the hive boxes are kept, such as in an orchard. Further, pop-up system 1010 and HVAC system 1030 are portable to enable deployment in remote areas that may not be accessible by a semitruck, as would be required for the larger MICA system 100 shown in earlier figures.

Figure 11:
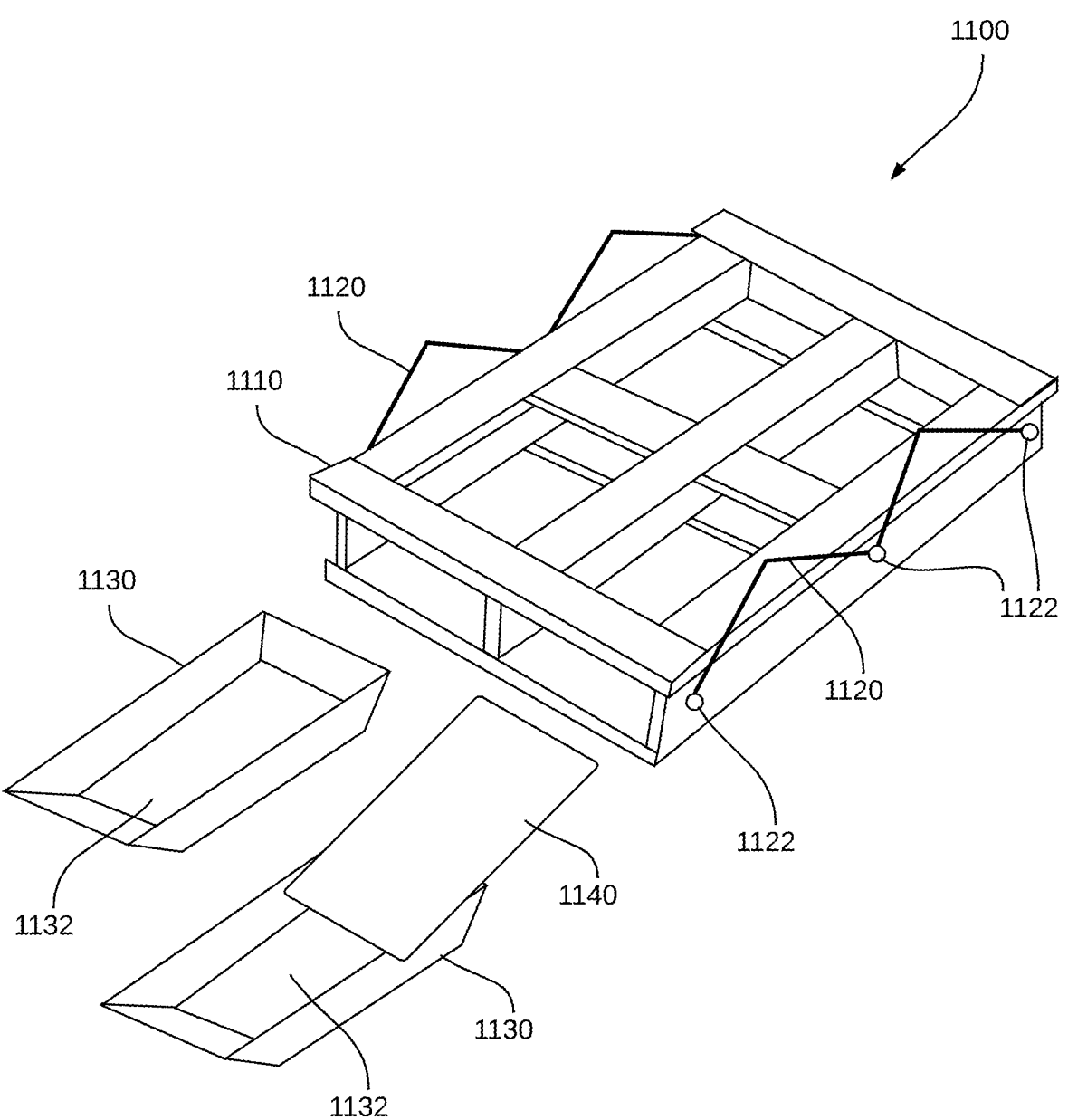
FIG. 11 shows a schematic of a pallet system suitable for use with bee keeping application, in accordance with an embodiment.

Turning to FIG. 11, a schematic of a pallet system suitable for use with bee keeping applications is shown, in accordance with an embodiment. A pallet system 1100 includes a pallet 1110. Pallet 1110 can be, for example, a standard pallet used in freight transportation, or a specialized pallet specifically dimensioned for hive boxes. Pallet 1110 includes cords 1120 secured to pallet 1110 by attachments 1122. Cords 1120 is formed, for example, of wire, rope, braided cord, or other thin, strong cordage. Cords 1120 provide ways to secure the straps (not shown) used to tie down the hive boxes onto pallet 1110, rather than having to pass the tie down straps all the way around the hive boxes and the boards that form the pallet. Pallet system 1100 further includes one or more trays 1130, which are configured for insertion into pallet 1100 beneath the hive boxes, in an embodiment. Trays 1130 are shaped for catching debris and dead bees that fall out of the hive boxes. Additionally, trays 1130 can be flipped over from the orientation shown in FIG. 11 such that bottom surface 1132 becomes the bottom board of a hive box, essentially sealing the bottom of the hive box, while the hive boxes are placed in the field during warm months. Trays 1130 is formed, for example, of a compostable material, such as cardboard or a compostable plastic, or another material such as wood, metal, or plastic. Optionally, one or more removable bottom board 1140 can be inserted on top of trays 1130 or on top of pallet 1110 so as to serve as the bottom board of the hive box, without flipping over tray 1130.

A variety of modifications, such as in the refrigeration, heating, ventilation, and dehumidification load requirements for particular installation scenarios of the MICA are possible. For example, the seal provided by structural envelope 120 of FIG. 1 is more crucial in certain climates than in others (e.g., overwintering of bees in frigid conditions in Canada would require higher integrity in the structural envelope than in Texas). Similarly, more stress would be placed on performance of the dehumidifier in high humidity environments, rather than in more temperate climates. Specifically regarding humidity, for example, it would be ideal for the health of the bee colonies if the humidity level within the MICA system is kept below the dewpoint at a particular installation location to avoid the formation of condensation within the hive boxes. In some cases, adjusting the system to accommodate higher or lower due points is more important than simply adjusting the internal humidity setting based on relative humidity measurements in order to avoid condensation within the hive boxes. The HVAC requirements of the MICA can be adjusted to accommodate the climate conditions at specific installation sites.

Figure 12:
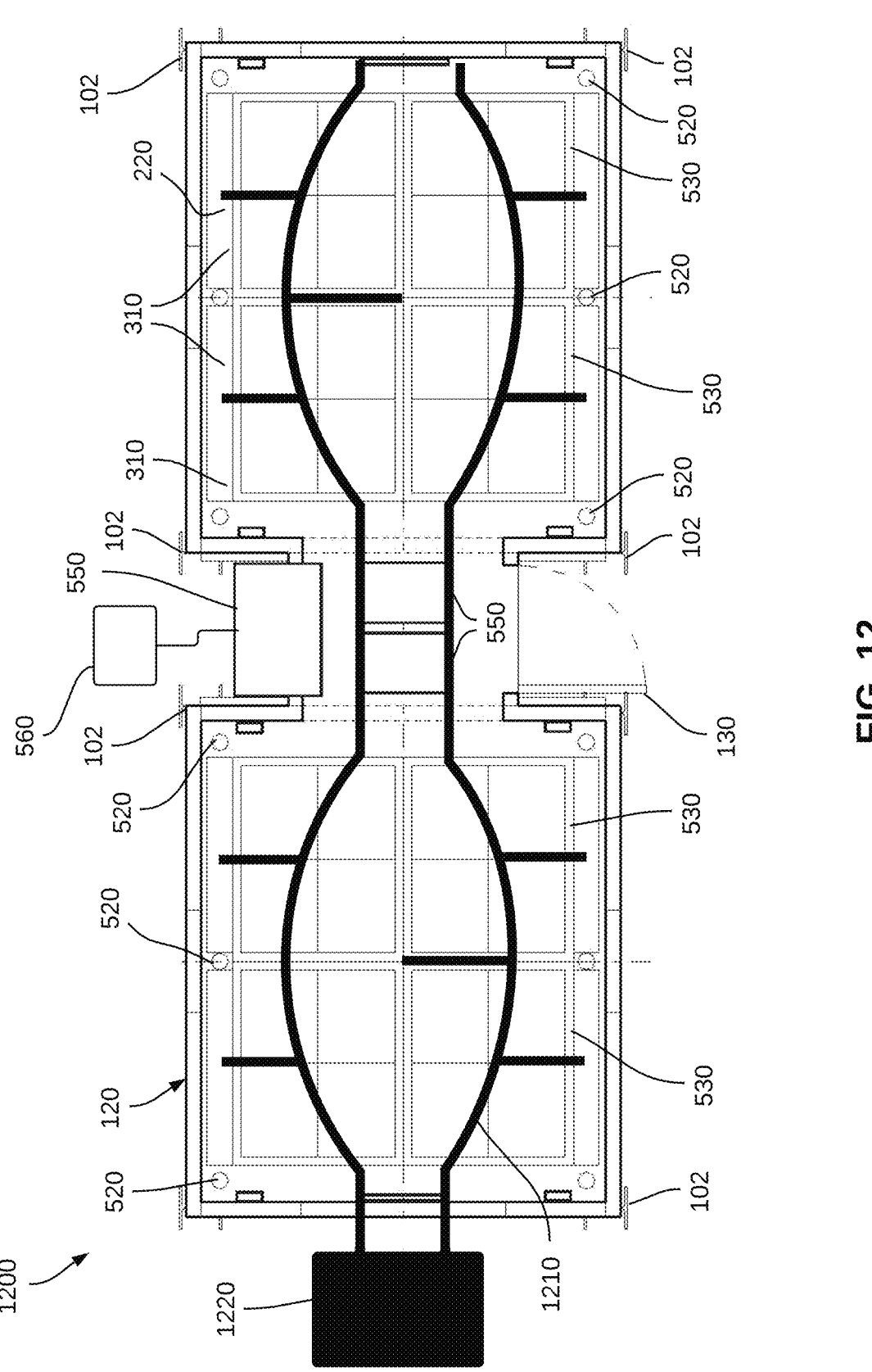
FIG. 12 shows a top, cutaway view of the MICA system, shown here to illustrate an exemplary placement configuration of ductwork and a refrigeration unit, in accordance with an embodiment.

FIG. 12 shows a top, cutaway view of the MICA system, shown here to illustrate an exemplary placement configuration of ductwork and a refrigeration unit, in accordance with an embodiment. As shown in FIG. 12, a MICA system 1200 includes a system of ductwork 1210 attached to a refrigeration unit 1220. Ductwork 1210 complements the workings of HVAC components 550 to send cold air to specific locations among the hive boxes stored within the MICA system. Optionally, refrigeration unit 1220 can be replaced by a heating system, a combination heating/cooling system, and/or a humidification control unit, depending on the needs of the specific installation location.

Figure 13:
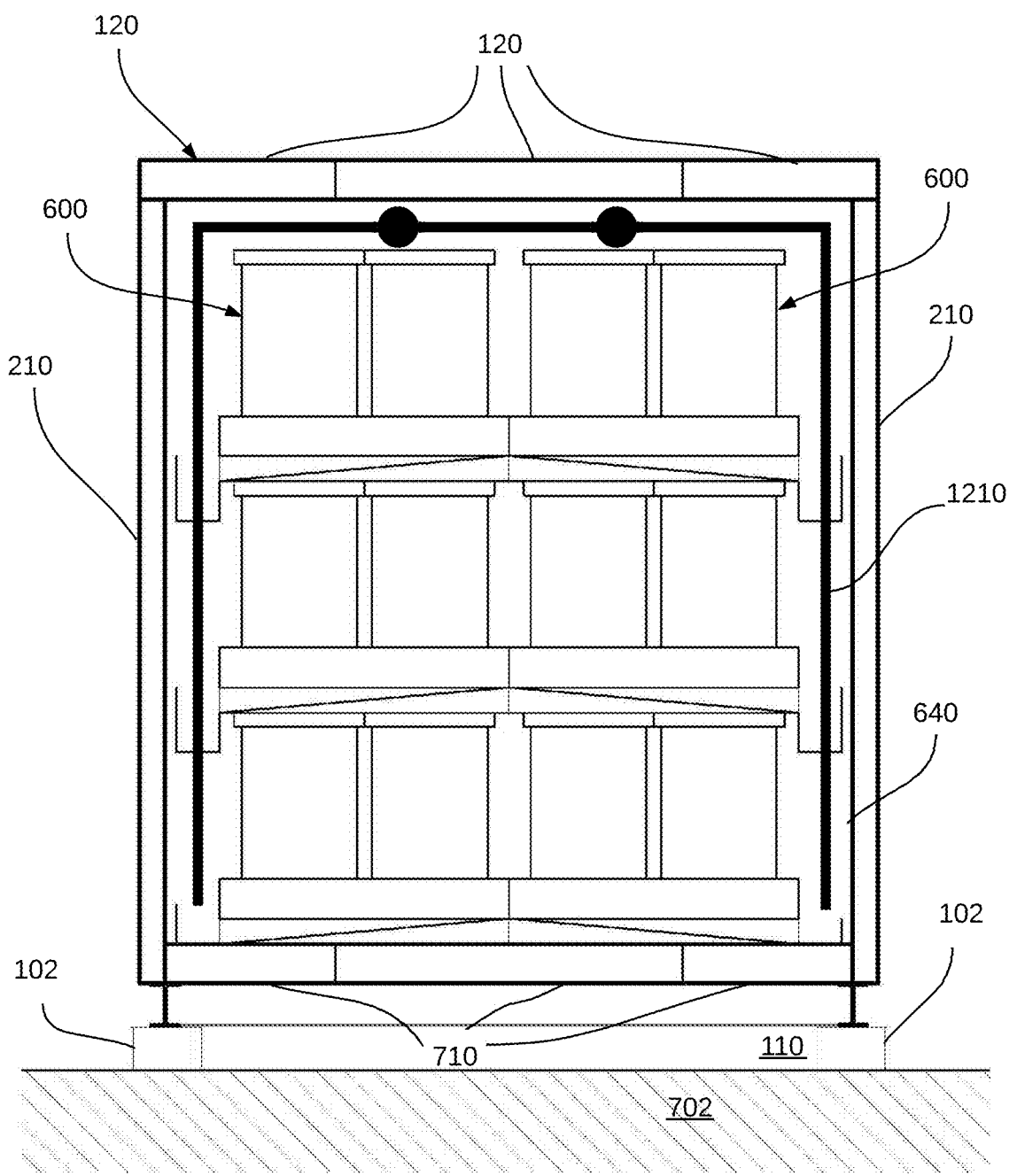
FIG. 13 shows an end, cutaway view of the MICA system, shown here to illustrate an alternate view of the ductwork configuration of FIG. 12, in accordance with an embodiment.

FIG. 13 shows an end, cutaway view of the MICA system, shown here to illustrate an alternate view of the ductwork configuration of FIG. 12, in accordance with an embodiment. In the example embodiment shown in FIG. 13, ductwork 1210 extends to near the bottom of the stack of hive boxes 600 so as to provide cold (or warm) air in the lower regions of the MICA system.

Beyond the beekeeping applications described above, there are currently available various products that address the need for environmental control for other entomology and agronomy applications. For instance, there are products on the market that focus on management of temperature and humidity management of environments, while other products add specific gases to manipulate the ripening timing of harvested fruits. Some examples of existing environmental control mechanisms include management of ethylene and oxygen ratios in containers used to regulate fruit ripening, the use of UV-C radiation as a germicide on fruits and vegetables in storage, and temperature regulation of containers used for cold storage of overwintering bees.

It is recognized herein that the complete control of an environment may be beneficial for the implementation of natural or synthetic processes in a variety of applications in entomology and agronomy. It would be desirable to simultaneously manage and balance several parameters including, for example, ambient gas mixture, electromagnetic radiation and chemical content of an enclosed environment.

For instance, it is recognized in the field of melittology that Radio Frequency (RF) and other electromagnetic radiation (e.g., from power lines) and the carbon dioxide ($CO_2$) content in a bee habitat may affect bee behavior and health, sometimes in a detrimental way. However, an integrated solution to regulate both RF radiation and $CO_2$ levels so as to promote bee health is not currently known.

Controlling both RF radiation (e.g., by blocking RF radiation) and the amount of $CO_2$ present in the bee habitat may be used to help manage bee health. Further, $CO_2$ content management may be further combined with temperature regulation and mite control mechanisms, such as selective introduction of oxalic acid, thymol, or formic acid vapors in environments for cold storage of bees. Additional functions, such as the combination of controlled introduction of chlorine dioxide ($ClO_2$) and UV-C radiation as a more effective germicide on bee equipment than either $ClO_2$ or UV-C radiation alone, may be provided by the systems described herein.

As described hereinafter, the present disclosure provides a mobile enclosure system including one or more subsystems configured for implementing a variety of environmental regulation functions including at least a control module and one or more of temperature control, humidity control, gas control, and electromagnetic exposure. In embodiments, the mobile enclosure system includes a mobile foundation and a plurality of insulated panels configured for modular assembly to form a structural envelope on top of the mobile foundation. In embodiments, the mobile enclosure system further includes a data collection subsystem for gathering environmental data within the structural envelope as well as power consumption of the various other subsystems implemented within the mobile enclosure system.

In certain embodiments, the structural envelope may be formed as a permanent structure, rather than be formed of a plurality of insulated panels. For example, conventional construction techniques, such as framed construction, prefabrication, and/or a pre-existing structure (e.g., a shipping container) may be placed on the mobile foundation to form the structural envelope. Such permanent structures may still be provided with the environmental regulation functions and data collection subsystem to form the mobile enclosure system as disclosed herein, in accordance with certain embodiments.

In certain embodiments, the mobile enclosure system essentially operates as a mobile container for entomology and agronomy applications, providing control over temperature, humidity, gas, and electromagnetic radiation for the environment within the mobile container. In embodiments, the mobile enclosure system includes two or more of the following:

1. A control unit to regulate and stabilize the parameters within the mobile enclosure system, which optionally may be controlled from a remote location and also records sensor data;
2. A refrigeration and heating unit for temperature control;
3. A humidifier/dryer unit for humidity control;
4. External gas tanks with electromagnetic valves and an air exchange unit to manage the gas composition;
5. An evaporator unit or aerosolizer to introduce chemicals in vapor form into the container;
6. Internal sensors for monitoring specified parameters and providing data related to the internal conditions of the stored contents (e.g., temperature, humidity, gas concentrations, and others) and, optionally, generate alerts when the monitored parameters deviate from targets;
7. External sensors (e.g., temperature, ambient pressure, wind speed, humidity, and others) for monitoring environmental conditions outside the mobile enclosure;
8. A metal shield for reducing external electromagnetic radiation;
9. Internal antennas to introduce RF or low frequency radiation (from 100 KHz to 50 GHz) when appropriate for non-honeybee related embodiments;
10. External antennas, positioned outside the mobile enclosure, for receiving and transmitting signals and data without introducing electromagnetic radiation within the container; and
11. Internal programmable lighting mechanisms, such as but not limited to infrared heat lamps, UV lamps, light emitting diode (LED) panels, fluorescent lamps, incandescent lamps, and other illumination mechanisms for providing illumination within the mobile enclosure system at one or more wavelengths (e.g., within a range of 300 to 1000 nm), with different illumination timing, pulsed or continuous, and other programmable sequences.

In embodiments, in addition to controlling the environment, the control unit may connect with a remote server (e.g., through the cloud) to collect data and send alarms via electronic messaging, such as text or emails, when there is an abnormal fluctuation in parameters.

In embodiments, the internal sensor may include one or more of a thermometer, a thermocouple, a hygrometer, a gas sensor, a spectrometer, an infrared monitor, an infrared camera, an image sensor, an optical monitor, and other sensors for monitoring specified parameters within the mobile enclosure system.

In embodiments, the mobile enclosure system includes a mobile foundation and a structural envelope formed on top of the mobile foundation at a desired location. The structural envelope may be formed, for example, of a plurality of insulated panels configured for repeated modular assembly and disassembly. In some embodiments, the insulated panels include edge features to enable assembly with or without additional tools and provide a continuous external and/or internal barrier when assembled. The insulated panels may be configured with strength, weight, and form factor to accommodate transport while assembled or disassembled. The mobile foundation is formed of a material with sufficient integrity to support at least tens of totes of produce and/or pallets of hive boxes thereon. The structural envelope and/or mobile foundation may be thermally insulated with one or more thermal insulation materials, such as but not limited to foam, fiberglass, glass wool, natural wool, cork, straw, hemp, resin, polyurethane, polystyrene, cellulose, polyethylene, polyisocyanurate, vacuum gap, gas-filled gap (e.g., air, neon, argon, and the like), aerogel, and phase change materials. Again, in some embodiments, the structural envelope may be formed as a permanent structure, rather than a plurality of panels configured for modular assembly and disassembly. The mobile enclosure system further includes the environmental regulation functions and data collection subsystem as described above.

In embodiments, various powered components of the mobile enclosure system may be configured to be operable using power from the power grid, electrical storage components (e.g., batteries), one or more generators, or a renewable energy source such as solar panels and wind turbines.

In embodiments, portions of the environmental regulation functions and data collection subsystem may be provided as interchangeable add-on packages for specific use case scenarios. For example, a basic enclosure package, including a mobile foundation and a structural envelope, may be configured to be compatible with one of a plurality of add-on packages, such as for entomology, agronomy, produce storage, and others. Optionally, the basic enclosure package may be provided with one or more connection hubs (e.g., including connector options for electrical, gas, liquid, vapor, and/or ductwork couplings) compatible with the add-on packages such that the add-on package used with a given basic enclosure package may be swapped out with a different add-on package.

Figure 14:
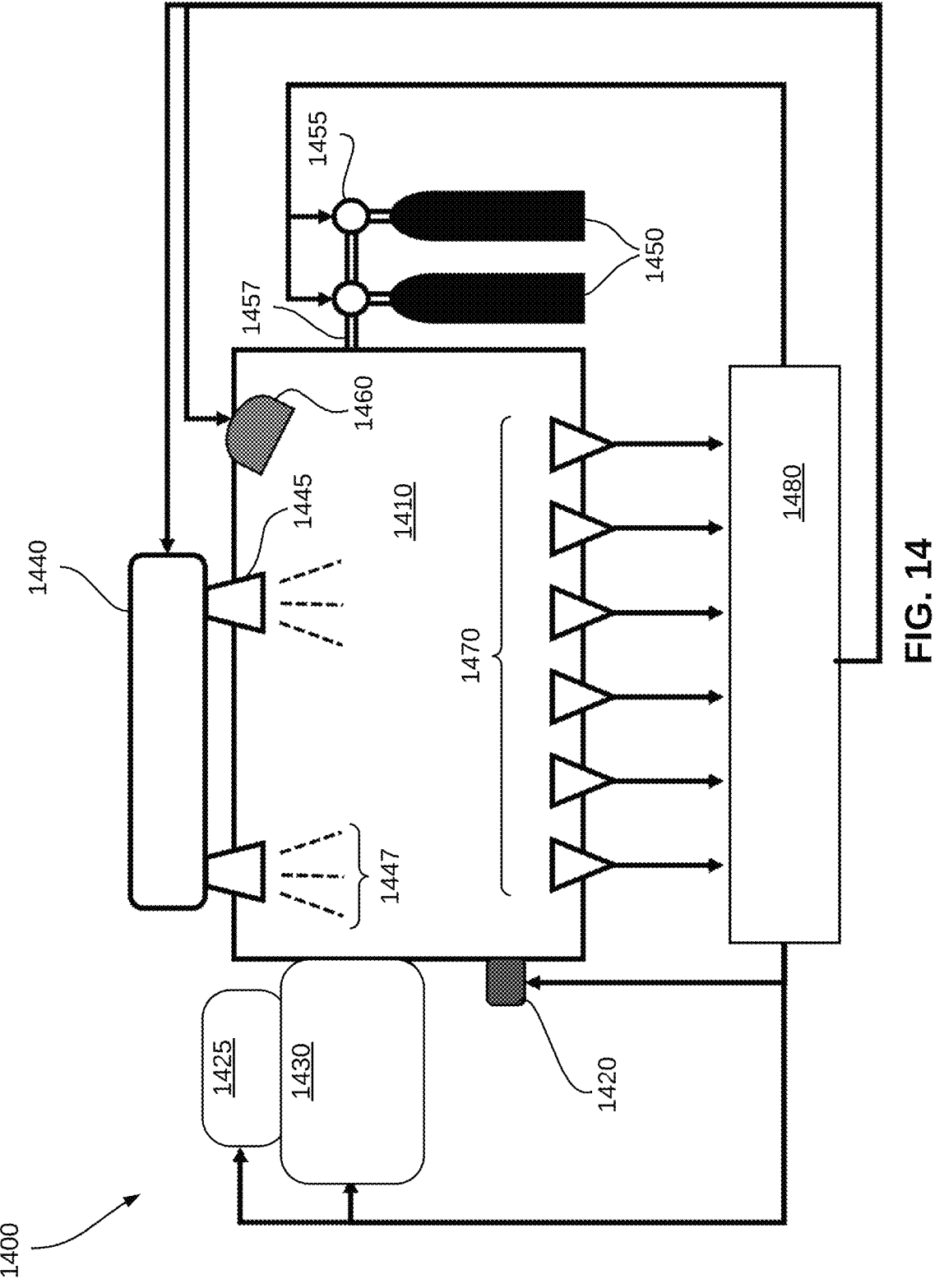
FIG. 14 shows a simplified schematic of an exemplary mobile enclosure system, in accordance with an embodiment.

FIG. 14 shows a simplified schematic of an exemplary mobile enclosure system, in accordance with an embodiment. As shown in FIG. 14, a mobile enclosure system 1400 includes a container 1410 equipped with a variety of subsystems. In certain embodiments, container 1410 may include a mobile foundation and a plurality of insulated panels forming an enclosed space suitable for repeated assembly and disassembly as well as transport, as described above with respect to the Mobile Indoor Controlled Apiary embodiments. In embodiments, container 1410 may be provided as a permanent structure positioned on the mobile foundation, rather than as a plurality of insulated panels. In certain embodiments, container 1410 may include insulation for thermal regulation (e.g., to assist with temperature regulation within container 1410) and/or radiation regulation (e.g., for keeping unwanted radiation out of the container). For instance, container 1410 may be integrated with a Faraday cage or container 1410 may itself be a Faraday cage to keep unwanted radiation out of container 1410.

In the illustrated example, mobile enclosure system 1400 includes an air exchange unit 1420 and a heating/cooling unit 1430 coupled with container 1410 and configured to provide air circulation and temperature regulation within container 1410. Optionally, heating/cooling unit includes a humidifier 1435 for assisting with the humidity regulation within container 1410. As another option, a dehumidifier (not shown) may be provided in place of or in addition to humidifier 1435, particularly for use in high humidity locations.

Continuing to refer to FIG. 14, mobile enclosure system 1400 may be further equipped with mechanisms for introducing specific amounts of gas or vapor into container 1410. For instance, controlled amounts of $CO_2$, nitrogen oxide ($NO_2$), aerosolized liquid vapor (e.g., citric acid, germicide compounds), and other gases and/or liquids used in entomology and agronomy applications may be provided into container 1410 using such mechanisms. In the exemplary embodiment illustrated in FIG. 14, mobile enclosure system 1400 is shown to include a liquid tank 1440 with evaporators/aerosolizers 1445 configured to introduce vapors 1447 (represented by dashed lines) into container 1410. Additionally, mobile enclosure system 1400 is coupled with gas tanks 1450 via a combination of valves 1455 and an inlet 1457, through which controlled amounts of gases may be introduced into container 1410.

Optionally, as shown in FIG. 14, mobile enclosure system 1400 may be additionally equipped with one or more antennae and/or illuminators 1460, placed internally or externally to the container. For example, an externally-placed antenna may be used for providing a communication link with an external location, such as via satellite link. In certain embodiments, the antenna may communicate with a positioning system (e.g., Global Positioning System, or similar) for obtaining accurate geolocation coordinates of the mobile enclosure system. An internally-placed illuminator may be used to provide visible light into container 1410 to aid in visual inspection of the conditions within the container using a camera. Alternatively or additionally, the illuminator may be configured for providing illumination outside of the visible wavelengths to provide, for example, ultraviolet radiation (e.g., for germicidal purposes), or infrared radiation that promote optimal conditions for bee health, storage conditions for harvested produce, or growth conditions for produce grown in the container.

Mobile enclosure system 1400 may be further equipped with a plurality of sensors 1470 for monitoring the conditions within container 1410. It is noted that, while sensors 1470 are shown as being located along one edge of container 1410, the sensors may be spread out and/or arrayed along different locations within container 1410 including, for instance, the ceiling, the floor, and on the walls at various heights. Sensors 1470 may include, for example, temperature sensors (e.g., thermometers, thermistors, thermal sensors, infrared cameras), hygrometers, altimeters, pressure sensors, gyroscopes, accelerometers, spectrometers, light sensors, gas sensors (e.g., to monitor $CO_2$ and other gases present in the container), location sensors (e.g., global positioning system (GPS)), and other sensors for monitoring the environmental and other conditions within container 1410. In embodiments, the sensors may provide location and orientation information of the mobile enclosure system (e.g., using the altimeter and gyroscope in combination, for example, a global positioning system). In certain embodiments, a portion of sensors 1470 may be configured for monitoring environmental conditions outside of container 1410, such as the weather and temperature conditions of the location in which mobile enclosure system 1400 has been placed.

Additionally, mobile enclosure system 1400 includes a control unit 1480 for providing centralized control over the various subsystems of mobile enclosure system 1400. For example, control unit 1480 may be electrically or wirelessly coupled with each of air exchange unit 1420, heating/cooling unit 1430, humidifier 1435, liquid tank 1440 and/or evaporators 1445, gas tanks and/or valves 1455 and/or inlet 1457, and antenna/illuminator 1460 for controlling their operations. In certain embodiments, control unit 1480 may also monitor the power consumption of the various subsystems. Control unit 1480 may also be configured to receive the outputs from sensors 1470 for use as feedback signals in regulating the various subsystems to meet the specific needs of items contained within container 1410. For example, control unit 1480 may use the outputs from sensors 1470 to adjust the operations of the subsystems to ensure ideal internal conditions for overwintering of honeybees or for harvested fruit in storage.

Figure 15:
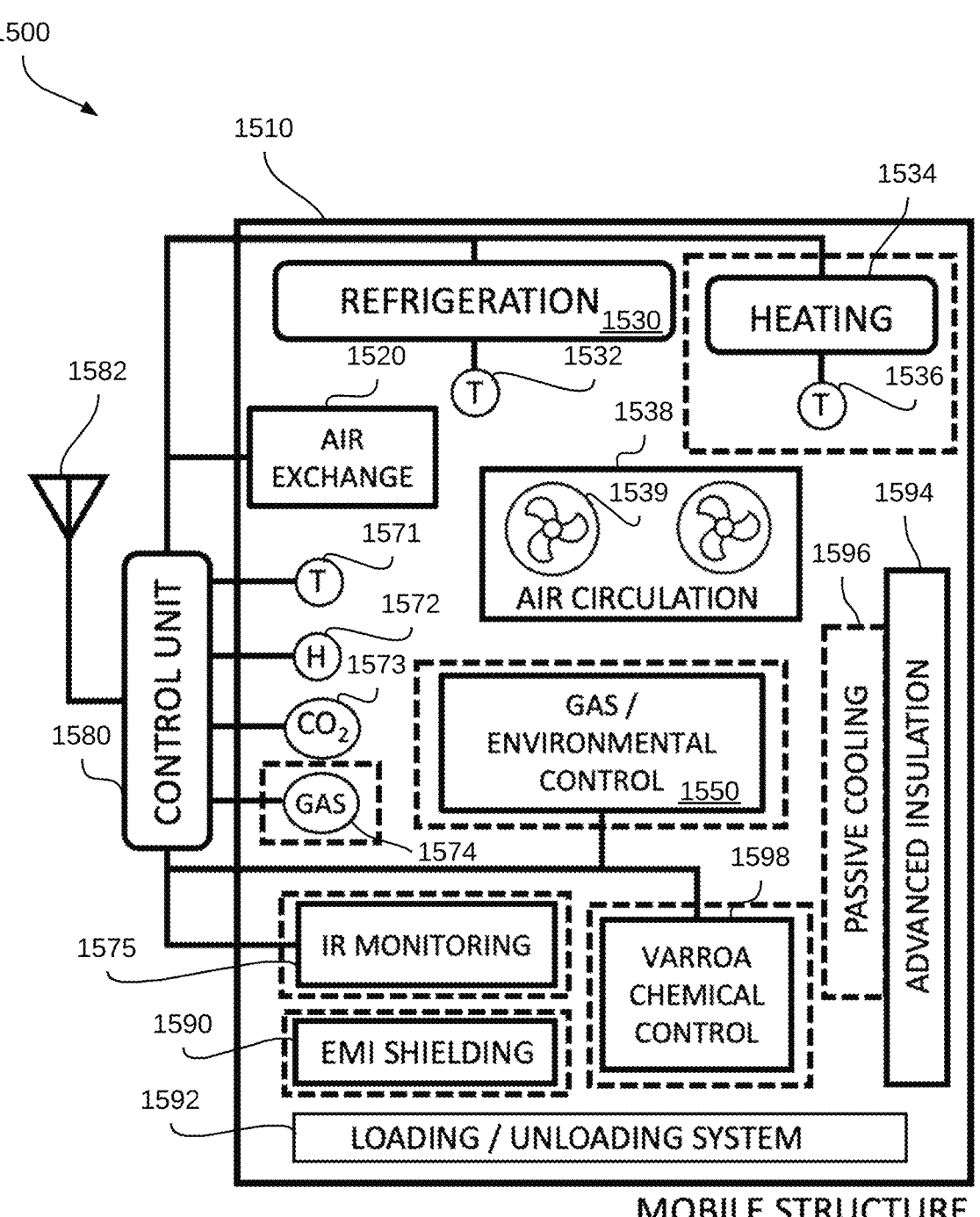
FIG. 15 shows an exemplary mobile enclosure system configured for use with beekeeping applications, in accordance with certain embodiments.

FIG. 15 shows an exemplary mobile enclosure system configured for use with beekeeping applications, in accordance with certain embodiments. A mobile enclosure system 1500 includes a container 1510, which may be for example container 1410 described above. Mobile enclosure system 1500 includes subsystems with features specifically selected for beekeeping applications, such as the overwintering of honeybees and other beekeeping tasks. In certain embodiments, container 1510 may include an embedded, mobile foundation, allowing for easy loading and unloading at various locations, as well as for moving the mobile enclosure system once the system has been assembled on the ground. For instance, as will be described in further detail below, embedded, mobile foundation may include features such as wheeled lifting jacks and forklift insertion points for assisting in moving the mobile enclosure system as required.

In the illustrated example, mobile enclosure system 1500 includes an air exchange unit 1520, along with a refrigeration unit 1530, coupled with its own temperature sensor 1532. Air exchange unit 1520 operates to manage oxygen and CO2 levels within container 1510, for example, to provide an ideal environment for bee health. Air exchange unit 1520 may also include an energy recovery ventilator to minimize heat loss and power consumption. Air exchange unit 1520 may or may not be vented to the external environment, depending on the specific use case scenario. For example, air exchange unit 1520 may include an economizer for bringing cold or warm external air into container 1510 when external conditions are appropriate.

Optionally, mobile enclosure system 1500 may also include a heating unit 1534 with its own temperature sensor 1536. In certain embodiments, refrigeration unit 1530 and heating unit 1534 may be provided as a single heating-ventilation-air conditioning (HVAC) unit. In certain cases, heating unit 1534 may be used to provide elevated temperatures within container 1510 to facilitate the collection of honey from the hive boxes (not shown) stored within container 1510. In other embodiments, one or the other of refrigeration unit 1530 and heating unit 1534 may be eliminated to adapt to the specific use location; for example, refrigeration unit 1530 may not be necessary if mobile enclosure system 1500 is intended for use in a frigid climate, or heating unit 1534 may not be required if mobile enclosure system 1500 is intended for use in a tropical climate. Mobile enclosure system 1500 may further include an air circulation unit 1538, such as one or more fans, air deflectors, or other mechanism for circulating the air within container 1510 as well as to promote a homogeneous temperature throughout the interior volume of container 1510. In certain embodiments, refrigeration unit 1530 and its temperature sensor 1532 may be independently operated with its own temperature control settings suitable for overwintering, brood break, and/or pest control for beekeeping equipment. For example, overwintering and brood break require temperature setting of approximately 40-degrees Fahrenheit, and honey extraction may ideally be performed at temperatures approximately 75-degrees Fahrenheit. In certain cases, refrigeration unit 1530 may be configured to temporarily reduce the temperature within the interior volume of container 1510 to 32-degrees Fahrenheit in order to eradicate pests on beekeeping equipment. As another example, 38-degrees Fahrenheit may be an ideal temperature for precooling produce such as grapes prior to long term cold storage. Various fruits and vegetables are generally stored at 32- to 55-degrees Fahrenheit.

Mobile enclosure system 1500 may further include a gas/environmental control unit 1550 for controlling the proportion of gas or aerosol dispensed into container 1510.

A plurality of additional sensors, such as a temperature sensor 1571, hygrometer 1572, $CO_2$ sensor 1573, a gas sensor 1574, and an infrared (IR) monitoring sensor 1575 may be included in mobile enclosure system 1500. For example, IR monitoring sensor 1575 may be configured with an IR light source as well as IR sensors for monitoring bee activity during wintering in visibly dark conditions. As bees are not sensitive to radiation in IR wavelengths, the bees may be illuminated and monitored with IR radiation without disturbing their natural behavior. IR monitoring sensor 1575 may be used to monitor for changes in bee behavior, such as an increase in activity under overwintering conditions, which may reflect bee stress caused by lack of food or an undetected environmental condition.

These data from these additional sensors may be provided into a control unit 1580 to monitor the internal temperature, humidity, CO2 levels, and other data, for example, at specific time intervals in various internal locations as well as the external conditions. The collected data may be used by control unit 1580 to regulate the operation of the various subsystems of mobile enclosure system 1500. In certain embodiments, the collected data may be transferred wirelessly to a remote server (e.g., through WiFi, satellite, or cellular options, or an external antenna (not shown)) to store and analyze the data as well as send text or email messages with the status of the internal environment and power conditions. The control unit may also include a transmitter. In some cases, custom software may be used to analyze data and provide feedback on providing optimal environmental conditions within container 1510 using, for example, model fitting, machine learning, or artificial intelligence prediction.

As shown in FIG. 15, the exemplary embodiment of mobile enclosure system 1500 includes additional components and features to address the specific needs of beekeeping. For example, container 1510 may be provided with Electromagnetic Interference (EMI) shielding 1590 to provide electromagnetic radiation protection functions of a Faraday Cage, preventing the entry of electromagnetic radiation into container 1510. This feature may be particularly useful when mobile enclosure system 1500 is located close to power lines or transmission towers, such as radio stations or cellular transmitters/repeaters, which may negatively affect bee health. Mobile enclosure system 1500 may also include a loading and unloading system 1592 (e.g., low friction planks or rails) to facilitate pallet movement into, out of, and within container 1510. For instance, a rail system may be provided within the container, running from the doors to the back of container 1510. Alternatively, the loading/unloading system may include one or more planks of low friction plastic with edge guides. The loading/unloading system may be configured for facilitating the transport of, for example, pallets or boxes placed thereon to desired locations within container 1510. Container 1510 may include advanced insulation 1594, such as aerogels and/or phase-change materials, which may provide a passive cooling function 1596. Mobile enclosure system 1500 may also include a Varroa chemical control unit 1598 for providing mite treatment within container 1510. For example, this module may include an evaporator/atomizer to provide micro-spay varroa mite treatment solutions within container 1510. The treatment solution may include oxalic acid, thymol, or formic acid vapors. Varroa chemical control unit 1598 may be operated by control unit 1580 in conjunction with gas/environmental control unit 1550 to simultaneously provide higher $CO_2$ levels to improve treatment efficiency. An interior skin of container 1510 may be formed of a durable, food-safe, and easily cleaned material, such as panels of aluminum, galvanized steel, or plastic (e.g., polyvinyl chloride) that may be fastened onto the internal walls of container 1510. In embodiments, plastic sheeting may be provided as an interior curtain along the interior walls of the container.

Figure 16:
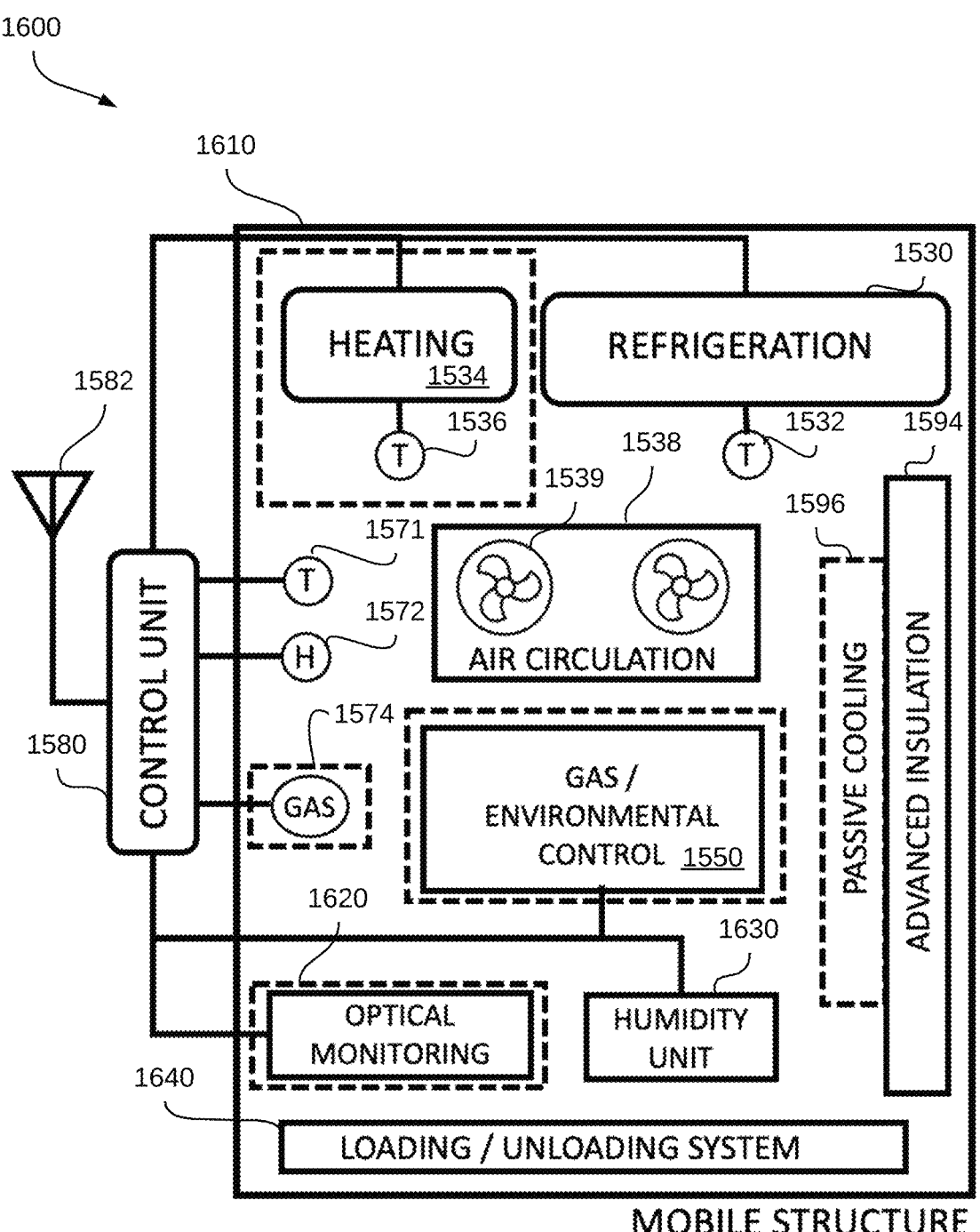
FIG. 16 shows an exemplary mobile enclosure system configured for use with the storage of post-harvest produce, in accordance with certain embodiments.

FIG. 16 shows an exemplary mobile enclosure system configured for use with the storage of post-harvest produce, in accordance with certain embodiments. The subsystems implemented with the mobile enclosure system of FIG. 16 are selected for ensuring freshness of fruits and vegetables stored within the system after being harvested.

In an embodiment, a mobile enclosure system 1600 includes a container 1610 and a plurality of subsystems similar to those described previously with respect to mobile enclosure system 1500 of FIG. 15. Refrigeration unit 1530 and, optionally, heating unit 1534 may be configured to provide optimal temperature regulation (e.g., different set points) for different types of produce. In certain embodiments, the refrigeration and heating units may provide pre-cooling and refrigeration on the same unit. For instance, certain varieties of produce benefit from a pre-cooling step, in which the produce is brought to an intermediate temperature, then stored at a colder temperature. Refrigeration unit 1530 and heating unit 1534 may be configured to cooperate to provide both the initial pre-cooling and longer term cold storage temperatures within mobile enclosure system 1600.

In certain embodiments, gas/environmental control unit 1550 is configured to control the gas mixture within container 1610. For example, gas/environmental control unit 1550 may include gas sources, valves, and other mechanisms to control the mixture of $CO_2$, nitrogen, argon, or other gases to promote or slow the ripening of the stored produce. In other embodiments, gas/environmental control unit 1550 may be further configured for capturing and removing ethylene within container 1610 to prevent accelerated ripening or decomposition of the stored produce. Gas sensor 1574 or additional gas sensor(s) (not shown) integrated with gas/environmental control unit 1550 may be used to provide enhanced gas mixture monitoring.

Additional subsystems may be integrated into mobile enclosure system 1600 for addressing the specific requirements of produce storage. For example, an optical monitoring unit 1620 may include illumination and optical detection or visual monitoring (e.g., using cameras or a sensor array) to monitor the conditions of produce within container 1610. For instance, one or more light emitting diode (LED) arrays may be used to illuminate a portion of the stored produce and a sensor array may be used to observe the condition of the illuminated portion. As an example, an IR, UV, and/or visible light illumination and a corresponding sensor array would be suitable for use as optical monitoring unit 1620. For instance, mobile enclosure system 1600 may be equipped with UV illumination and/or photoluminescence monitoring with a wavelength-dependent sensor array or spectrometer.

Another useful subsystem for mobile enclosure system 1600 is a humidity unit 1630, which may include a humidifier and/or dehumidifier to regulate the humidity levels within container 1610. Humidity unit 1630 may be controlled by control unit 1580 in accordance with the readings from hygrometer 1572, for example.

Figure 17:
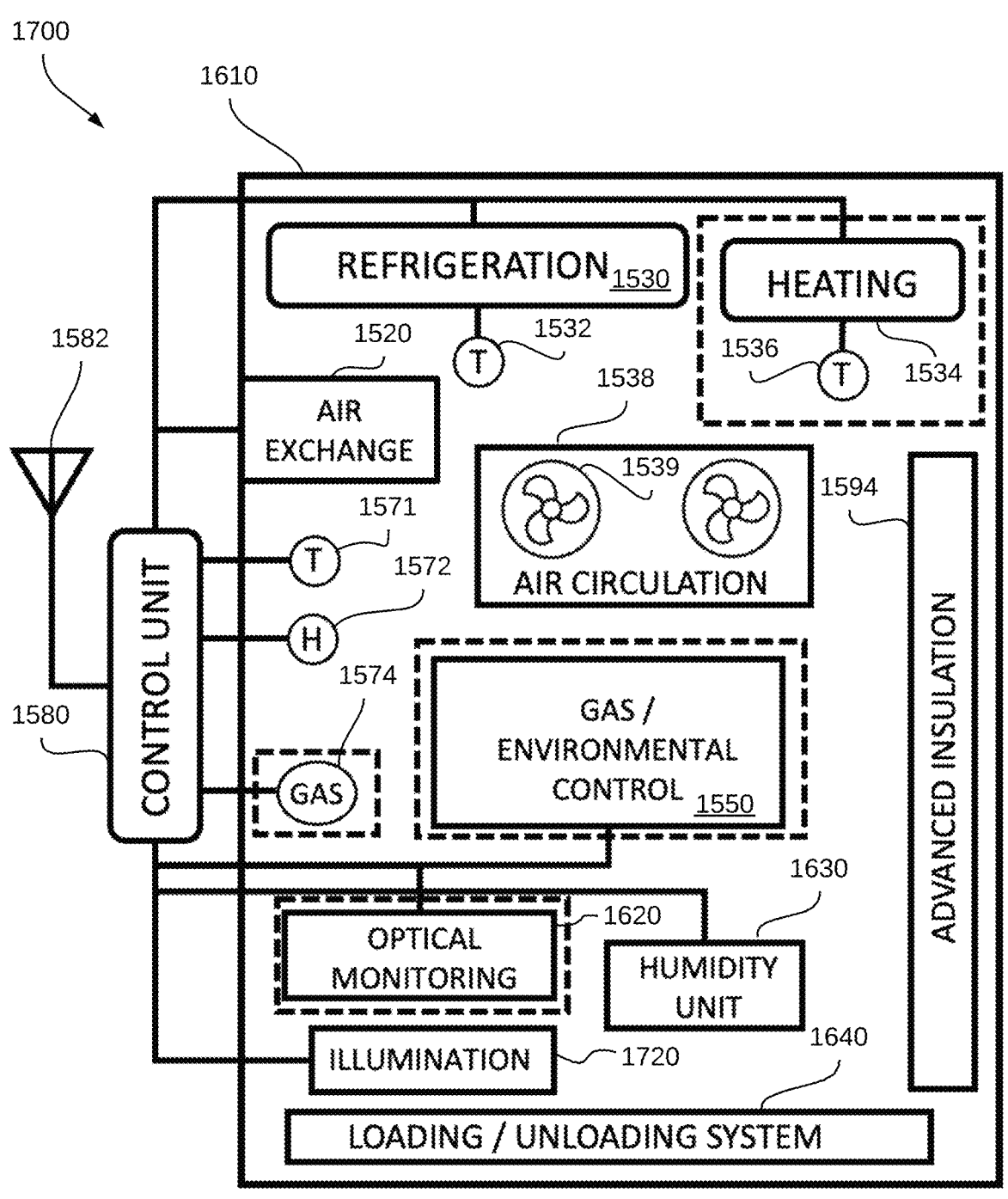
FIG. 17 shows an exemplary mobile enclosure system configured for use with agricultural production of specialty crops, in accordance with certain embodiments.

FIG. 17 shows an exemplary mobile enclosure system configured for use with agricultural production of specialty crops, in accordance with certain embodiments. For instance, a mobile enclosure system 1700 of FIG. 17 may be suitable for indoor growth of produce such as mushrooms, berries, or cannabis.

Many of the components of mobile enclosure system 1700 may be similar to those of mobile enclosure system 1600. Additionally, a container 1710 of mobile enclosure system 1700 may include an illumination unit 1720 for promoting growth of the specific produce grown within container 1710. In some embodiments, illumination unit 1720 may include one or more light panels (e.g., LED arrays or other source of visible, UV, or IR radiation). In certain cases, illumination unit 1720 may provide a range of radiation wavelengths. Further, in certain embodiments, illumination 1720 may be a multiwavelength, programmable light panels. Specific light wavelengths and schedules may be tailored to the specific produce being cultivated within mobile enclosure system 1700.

Figure 18:
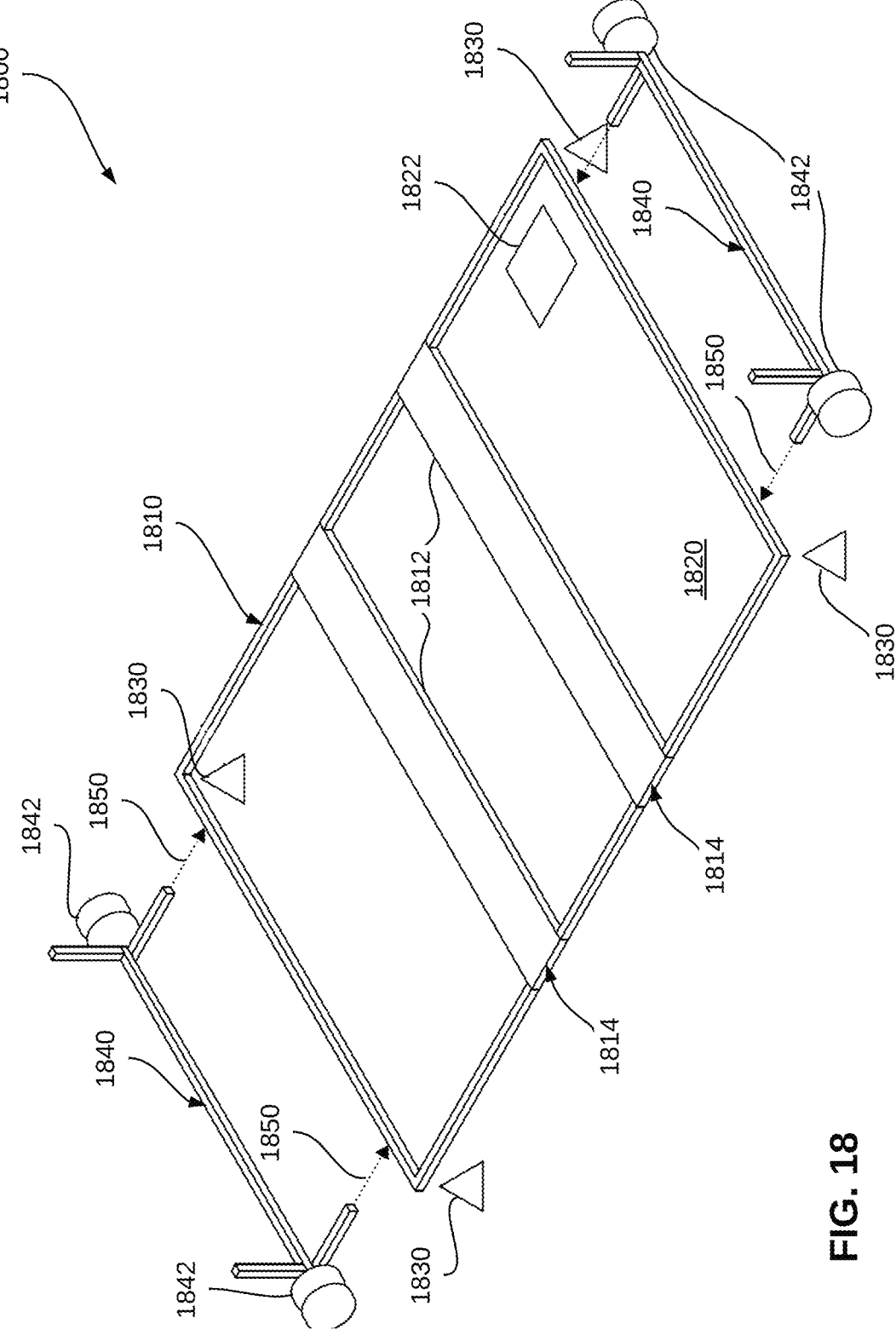
FIG. 18 shows an exemplary embedded foundation system, in accordance with certain embodiments.

An exemplary embodiment of an embedded foundation is illustrated in FIG. 18. As shown in FIG. 18, an embedded foundation system 1800 includes a frame 1810, in accordance with an embodiment. Frame 1810 may include one or more cross braces 1812. In certain embodiments, cross braces 1812 may be spaced apart and include openings 1814 such that the forks of a standard forklift may be inserted into openings 1814 to help lift embedded foundation system 1800 as necessary.

Frame 1810 may further support a floor 1820. Floor 1820 may in turn support, for example, an air duct therethrough with an opening 1822 accessible through floor 1820 for connection to HVAC components within the container to be supported by embedded foundation system 1800. In certain embodiments, opening 1822 and other portions of floor 1820 may also be configured to provide access to electrical conduits, water and/or gas supply tubing, and other supply management features (not visible in FIG. 18). For instance, frame 1810 and floor 1820 may together define a chase space with room for accommodating electrical and other supply conduits. Alternatively, such electrical and supply conduits may be affixed within or embedded into frame 1810 and/or floor 1820. In examples, one or more access ports and outlets may be affixed to frame 1810 and/or floor 1820 with standard connectors or couplers to provide ready access to electrical wiring and/or supply conduits without requiring a user to separately run such wiring and conduits through embedded foundation system 1800.

Additionally, embedded foundation system 1800 may include a plurality of leveling feet 1830 for supporting and, as necessary, leveling frame 1810 and/or floor 1820. While represented by triangular shapes, a variety of leveling feet configurations are contemplated and considered to be a part of the present disclosure.

Further, in the illustrated example in FIG. 18, embedded foundation system 1800 may optionally include or be compatible with a plurality of wheel jacks. For instance, such wheel jacks may include a frame structure 1840 supporting a plurality of wheels 1842. The wheel jacks may be inserted under or into frame 1810 (e.g., as indicated by arrows 1850) to support embedded foundation system 1800 for assisting with moving the embedded foundation system, with or without the remainder of the mobile enclosure system supported thereon.

Figure 19:
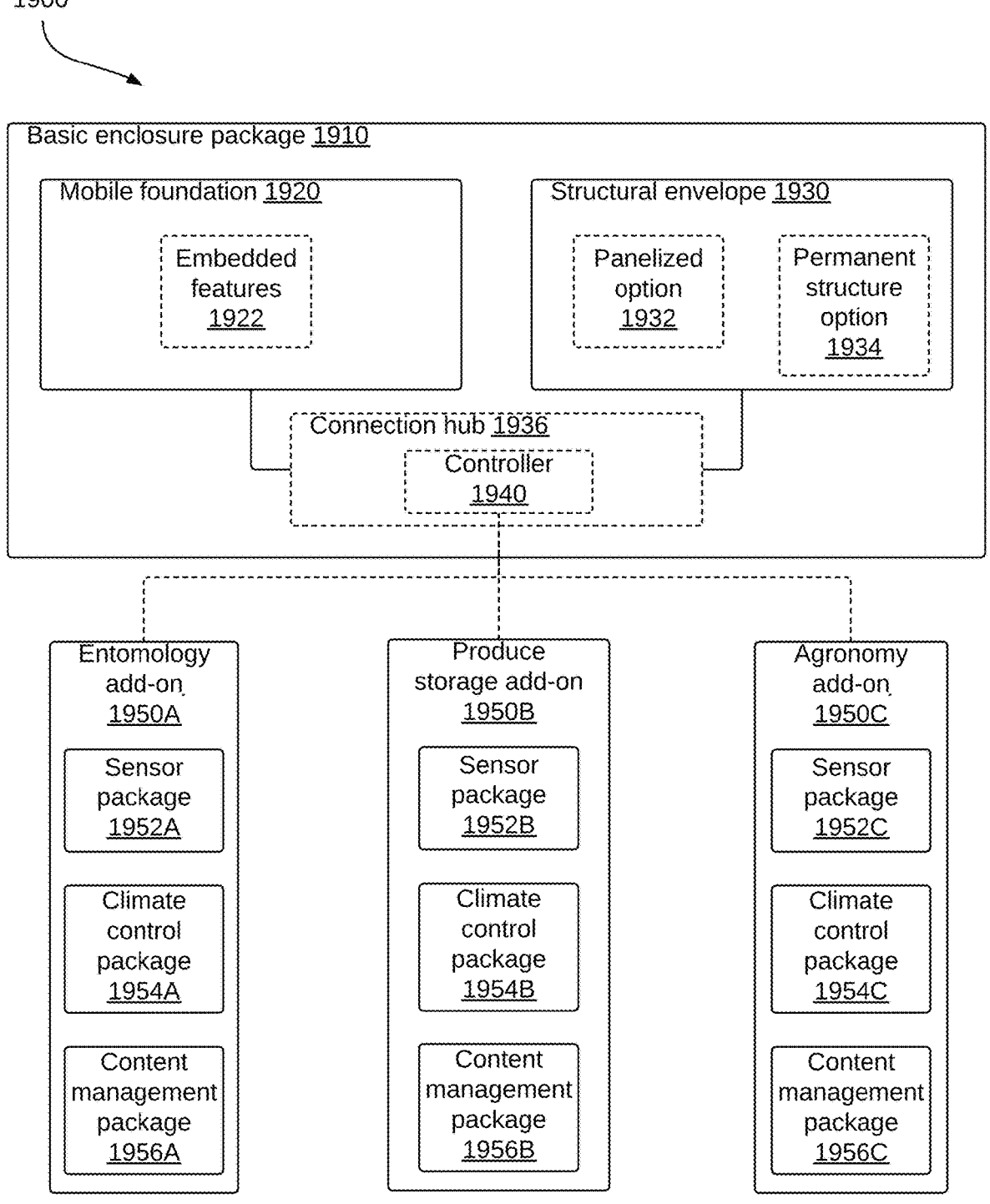
FIG. 19 shows an exemplary mobile enclosure system with interchangeable add-ons, in accordance with certain embodiments.

FIG. 19 illustrates a modular, mobile enclosure system compatible with different add-on packages, in accordance with certain embodiments. A mobile enclosure system 1900 includes a basic enclosure package 1910. In the illustrated example, basic enclosure package 1910 includes a mobile foundation 1920 and, optionally, embedded features 1922, such as those described above with respect to embedded foundation system 1800 of FIG. 18. Basic enclosure package 1910 further includes a structural envelope 1930. Structural envelope 1930 may optionally be formed with a plurality of panels (e.g., as described above with respect to the MICA implementations) in a panelized option 1932, or as a permanent structure option 1934.

Optionally, basic enclosure package 1910 includes a connection hub 1936, which may include, for example, connectors, couplers, and/or interface options for electrical, gas, liquid, vapor, and/or ductwork couplings. In examples, connection hub 1936 may include connection options compatible with a plurality of add-on packages (described in further detail hereinafter) such that the add-on packages may be swapped out for use with a given basic enclosure package. In certain embodiments, connection hub 1936 may include a controller 1940 for identifying the specific add-on package connected with basic enclosure package 1910 and controlling the function thereof. In other embodiments, each one of the add-on packages may include its own controller unit. As an alternative, controller 1940 may be provided as a separate component from connection hub 1936.

Continuing to refer to FIG. 19, mobile enclosure system 1900 may be provided with one or more add-on packages tailored for specific applications, such as beekeeping, growing of specialty crops, and cold storage of harvested produce. That is, rather than a single-purpose mobile enclosure system provided with features customized for a specific application, mobile enclosure system 1900 may be configured to be compatible with multiple add-on packages for different applications, wherein the add-on packages may be swapped out to enable the use of one mobile enclosure system for multiple use case scenarios.

While three different add-on packages are shown in the illustrated example in FIG. 19, variations for add-on packages for additional applications are also contemplated and are considered to be a part of the present disclosure. In the embodiment shown in FIG. 19, an entomology add-on 1950A may include, for example, a sensor package 1952A including sensors that are particularly useful for use with entomology applications such as beekeeping and other types of insect monitoring. Sensor package 1952A may include, for example, a network of temperature sensors and/or thermal cameras for monitoring temperatures at multiple locations within the structural envelope, thus enabling identification of changes in hive temperatures that may indicate health issues at specific hives. Sensor package 1952A may further include $CO_2$ sensors of sufficient sensitivity to monitor the subtle changes in $CO_2$ emissions that may indicate corresponding variations in hive activity. In examples, the various sensor components shown in FIG. 15 may be incorporated in sensor package 1952A.

Entomology add-on 1950A may further include a climate control package 1954A, which may include a suite of environmental control systems specifically applicable for entomology use case scenarios. For instance, the components shown in FIG. 15 may again be suitable for inclusion in climate control package 1954A.

Optionally, sensor package 1952A and/or climate control package 1954A may include a controller unit (not shown) for controlling the functions of entomology add-on 1950A. Alternatively, one or more of the components of entomology add-on 1952A may be controlled by controller 1940 provided as a part of basic enclosure package 1910.

Further, entomology add-on 1950A may further include a content management package 1956A. Content management package 1956A may include features for handling the specific contents applicable for entomology applications, such as a pallet system (e.g., as shown in FIG. 11), honey collection system, or a rail system as discussed above.

Still referring to FIG. 19, other variations in add-on packages are contemplated. For example, a produce storage add-on 1950B may include a sensor package 1952B, a climate control package 1954B, and a content management package 1956B, wherein each one of these packages including components suitable for use with produce storage applications (e.g., as shown in FIG. 16). Similarly, an agronomy add-on 1950C may include a sensor package 1952C, a climate control package 1954C, and a content management package 1956C including components (e.g., as described in reference to FIG. 17) useful in applications related to managing growth of specialty crops, for example. In embodiments, a user may integrate the entomology add-on during winter for overwintering of bees, then swap out the entomology add-on for the produce storage add-on during the summer months, and vice versa. Other add-on packages and swap scenarios are also contemplated and are considered a part of the present disclosure.

While the above description focuses on embodiments of a mobile enclosure system for entomology and agronomy applications, the mobile enclosure system may be useful in a variety of other use case scenarios. Further, in embodiments, a mobile enclosure system may be configured in a modular manner such that the same container may be equipped with different subsystems. As an example, a given container may be configured for beekeeping (e.g., as shown in FIG. 15) for a winter then, with different settings for the controller, be converted to a produce storage system during the summer and fall months (e.g., as shown in FIG. 16). Subsequently, the mobile enclosure system may then be converted into an agricultural production system (e.g., as shown in FIG. 17) in a different season by the addition of a programmable illumination unit and other subsystem or controller setting modifications.

Accordingly, many different embodiments stem from the above description and the drawings. It will be understood that it would be unduly repetitious and obfuscating to literally describe and illustrate every combination and subcombination of these embodiments. As such, the present specification, including the drawings, shall be construed to constitute a complete written description of all combinations and subcombinations of the embodiments described herein, and of the manner and process of making and using them, and shall support claims to any such combination or subcombination.

In the specification, there have been disclosed embodiments of the invention and, although specific terms are employed, they are used in a generic and descriptive sense only and not for purposes of limitation. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The terms and expressions employed herein are used as terms and expressions of description and not of limitation, and there is no intention, in the use of such terms and expressions, of excluding any equivalents of the features shown and described or portions thereof. Each of the various elements disclosed herein may be achieved in a variety of manners. This disclosure should be understood to encompass each such variation, be it a variation of an embodiment of any apparatus embodiment, a method or process embodiment, or even merely a variation of any element of these. Particularly, it should be understood that the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled.

As but one example, it should be understood that all action may be expressed as a means for taking that action or as an element which causes that action. Similarly, each physical element disclosed should be understood to encompass a disclosure of the action which that physical element facilitates. Regarding this last aspect, by way of example only, the disclosure of a "protrusion" should be understood to encompass disclosure of the act of "protruding"—whether explicitly discussed or not—and, conversely, were there only disclosure of the act of "protruding", such a disclosure should be understood to encompass disclosure of a "protrusion". Such changes and alternative terms are to be understood to be explicitly included in the description.

The following references provide background material related to the present disclosure:

Thielens, A., Bell, D., Mortimore, D. B. et al. Exposure of Insects to Radio-Frequency Electromagnetic Fields from 2 to 120 GHz. Sci Rep 8, 3924 (2018). https://doi.org/10.1038/s41598-018-22271-3

R. C. R. Tustain & J. Faulke (1979) Effect of carbon dioxide anesthesia on the longevity of honey bees in the laboratory, New Zealand Journal of Experimental Agriculture, 7:3, 327-329, https://doi.org/10.1080/03015521.1979.10429094

The invention claimed is:

1. A mobile enclosure system comprising:
a container;
a plurality of subsystems coupled with the container, the plurality of subsystems including at least one of:
a heating unit configured for providing heat into the container,
a cooling unit configured for providing cooling into the container,
a humidity control unit for modifying a humidity within the container, and
a gas/vapor input unit for providing at least one of a gas and a vapor into the container; and
a plurality of sensors for monitoring environmental conditions within the container and generating environmental data; and a control unit connected with the plurality of subsystems and the plurality of sensors,
wherein
the container comprises
a mobile foundation, and
a structural envelope on top of the mobile foundation,
the control unit is configured for
tracking power consumption by the plurality of subsystems coupled with the container,
receiving the environmental data from the plurality of sensors, and
modifying at least one operating parameter of the plurality of subsystems in accordance with the environmental data,
the plurality of subsystems and the plurality of sensors are selected for use with agronomy applications, and
the plurality of subsystems includes programmable illumination configured for providing time-controlled illumination tailored for growth of a particular crop.

2. The mobile enclosure system of claim 1,
wherein the plurality of subsystems further includes at least one of:
an air circulation unit,
a gas/environmental control unit,
an infrared monitoring unit,
a Varroa chemical control unit,
an electromagnetic interference (EMI) shielding mechanism,
a loading/unloading system,
advanced insulation,
optical monitoring unit, and
an illumination unit.

3. The mobile enclosure system of claim 1,
wherein the plurality of sensors are configured for monitoring at least one of:
temperature,
humidity,
altitude,
pressure,
orientation of the container,
location,
gas composition within the container,
illumination, and
electromagnetic radiation.

4. The mobile enclosure system of claim 1,
wherein at least a portion of the plurality of sensors is configured for monitoring an environmental condition outside of the container, the environmental condition including at least one of:
temperature,
humidity,
pressure, and
electromagnetic radiation.

5. The mobile enclosure system of claim 1,
wherein the structural envelope is defined by a plurality of insulated panels configured for repeatably being assembled and disassembled to form the structural envelope on top of the mobile foundation.

6. The mobile enclosure system of claim 1,
wherein the structural envelope is defined by a permanent structure.

7. The mobile enclosure system of claim 1, wherein the structural envelope further includes at least one of foam, fiberglass, glass wool, natural wool, cork, straw, hemp, resin, polyurethane, polystyrene, cellulose, polyethylene, polyisocyanurate, vacuum gap, gas-filled gap, aerogel, and phase change material.

8. The mobile enclosure system of claim 7, wherein the phase change material is selected for providing a passive cooling effect with temperature as the phase change material changes from a first phase to a second phase.

9. The mobile enclosure system of claim 1, wherein the plurality of subsystems and the plurality of sensors are selected and provided as a first add-on package.

10. The mobile enclosure system of claim 9, further comprising a second add-on package including a second plurality of subsystems and a second plurality of sensors, wherein the second plurality of subsystems and the second plurality of sensors are configured for compatibility with the container and the controller, and wherein the second add-on package is configured to be swapped out with the first add-on package.

11. The mobile enclosure system of claim 1, wherein the plurality of subsystems and the plurality of sensors are selected for use with entomology applications.

12. The mobile enclosure system of claim 11, wherein the plurality of subsystems include at least one of $CO_2$ control, ultraviolet light application, and chemical vapor application for varroa mite mitigation.

13. The mobile enclosure system of claim 11, wherein the plurality of subsystems includes temperature control for elevating the temperature within the container during honey collection processes.

14. The mobile enclosure system of claim 1, wherein the plurality of subsystems and the plurality of sensors are selected for use with produce storage applications.

15. The mobile enclosure system of claim 1, wherein the plurality of subsystems includes coordinated temperature and gas content control for inducing ripening of produce stored within the container.

\* \* \* \* \*